United States Patent
Coombes et al.

(10) Patent No.: US 10,159,134 B2
(45) Date of Patent: Dec. 18, 2018

(54) END OF LIFE PREDICTION SYSTEM FOR LUMINAIRE DRIVERS

(71) Applicant: Gooee Limited, St Albans (GB)

(72) Inventors: Simon Coombes, St Petersburg, FL (US); Benjamin Hughes, Bedfordshire (GB); Shmuel Silverman, Novato, CA (US); Jonathan Couch, Wilshire (GB)

(73) Assignee: Gooee Limited, St Albans (GB)

( * ) Notice: Subject to any disclaimer, the term of this patent is extended or adjusted under 35 U.S.C. 154(b) by 0 days.

(21) Appl. No.: 15/809,559

(22) Filed: Nov. 10, 2017

(65) Prior Publication Data
US 2018/0070422 A1 Mar. 8, 2018

Related U.S. Application Data

(63) Continuation-in-part of application No. 15/424,868, filed on Feb. 5, 2017, now Pat. No. 9,992,843, which
(Continued)

(51) Int. Cl.
*H05B 37/02* (2006.01)
*H05B 33/08* (2006.01)
*H04W 4/02* (2018.01)

(52) U.S. Cl.
CPC ..... *H05B 33/0884* (2013.01); *H05B 33/0845* (2013.01); *H05B 33/0851* (2013.01);
(Continued)

(58) Field of Classification Search
CPC ............ H05B 33/0845; H05B 33/0854; H05B 33/0872; H05B 37/0227; H05B 37/0272;
(Continued)

(56) References Cited

U.S. PATENT DOCUMENTS 3,971,065 A 7/1976 Bayer
4,245,241 A 1/1981 Sato et al.
(Continued)

FOREIGN PATENT DOCUMENTS

CA 1315331 C 3/1993
CA 2594246 A1 1/2008
(Continued)

OTHER PUBLICATIONS

Lighting Research Center, ASSIST: Alliance for Solid-State Illumination Systems and Technologies, Feb. 15, 2005, 2 pages, http://www.lrc.rpi.edu/programs/solidstate/assist/index.asp.
(Continued)

*Primary Examiner* — Tung X Le
(74) *Attorney, Agent, or Firm* — Moyles IP, LLC

(57) ABSTRACT

Devices, systems, and methods to predict a half-life or end of life for luminaire drivers are described. The drivers may include electronic drivers for light fixtures such as dimming controls that utilize electrolytic capacitors in the output circuit to smooth the output current and reduce changes in current amplitude. Half-life and end of life for the drivers may be predicted by monitoring failure variable indications of the driver and the luminaire light, including the light intensity depreciation of the light, and by evaluating the data from both the driver, light, and environment in which the driver and/or luminaire is installed to predict the most imminent half-life and/or end of life.

15 Claims, 24 Drawing Sheets

Related U.S. Application Data is a continuation-in-part of application No. 15/360,879, filed on Nov. 23, 2016, now Pat. No. 9,656,197.

(60) Provisional application No. 62/420,908, filed on Nov. 11, 2016, provisional application No. 62/445,669, filed on Jan. 12, 2017, provisional application No. 62/306,636, filed on Mar. 11, 2016.

(52) U.S. Cl.
CPC ..... *H05B 33/0866* (2013.01); *H05B 33/0893* (2013.01); *H05B 37/0227* (2013.01); *H05B 37/0245* (2013.01); *H04W 4/023* (2013.01)

(58) Field of Classification Search
CPC . H05B 37/0281; H05B 37/0254; H05B 37/03
USPC ........................................ 315/307, 312, 360
See application file for complete search history.

(56) References Cited

U.S. PATENT DOCUMENTS

| | | | |
|---|---|---|---|
| 4,894,601 A | 1/1990 | Watkins | |
| 4,945,280 A | 7/1990 | Beghelli | |
| 5,154,504 A | 10/1992 | Helal et al. | |
| 5,770,928 A | 6/1998 | Chansky et al. | |
| 6,538,568 B2 | 3/2003 | Conley, III | |
| 7,045,964 B1 | 5/2006 | Hermans | |
| 7,248,297 B2 | 7/2007 | Catrysse et al. | |
| 7,777,427 B2 | 8/2010 | Stalker, III | |
| 7,893,632 B2 | 2/2011 | Meijer et al. | |
| 7,950,832 B2 | 5/2011 | Tanaka et al. | |
| 8,319,452 B1 | 11/2012 | Hamel et al. | |
| 8,442,785 B2 | 5/2013 | Walters et al. | |
| 8,643,304 B2 | 2/2014 | Hamel et al. | |
| 8,729,834 B1 | 5/2014 | Funderburk et al. | |
| 8,928,232 B2 | 1/2015 | Aggarwal et al. | |
| 9,084,308 B2 | 7/2015 | Morrow | |
| 9,131,581 B1 | 9/2015 | Hsia et al. | |
| 9,148,936 B2 | 9/2015 | Wagner et al. | |
| 9,277,632 B2 | 3/2016 | Hegarty | |
| 9,374,874 B1* | 6/2016 | Ewing | H05B 37/0272 |
| 9,408,280 B2 | 8/2016 | Schröder et al. | |
| 9,521,733 B2 | 12/2016 | Brand et al. | |
| 9,655,197 B1 | 5/2017 | Coombes et al. | |
| 2006/0237636 A1 | 10/2006 | Lyons et al. | |
| 2012/0025740 A1* | 2/2012 | Schenk | H05B 37/0272 315/312 |
| 2012/0139417 A1 | 6/2012 | Mironichev et al. | |
| 2013/0181636 A1 | 7/2013 | Agrawal | |
| 2013/0193876 A1 | 8/2013 | Cleland et al. | |
| 2014/0074434 A1* | 3/2014 | De Lima | H05B 33/0893 702/183 |
| 2014/0097758 A1 | 4/2014 | Recker et al. | |
| 2014/0320022 A1 | 10/2014 | Lee | |
| 2014/0375221 A1 | 12/2014 | Mans et al. | |
| 2015/0130365 A1 | 5/2015 | Kim et al. | |
| 2015/0257243 A1 | 9/2015 | Saffari et al. | |
| 2016/0003670 A1 | 1/2016 | Li et al. | |
| 2016/0014867 A1 | 1/2016 | Luk | |
| 2016/0036268 A1 | 2/2016 | Laherty et al. | |
| 2016/0088711 A1 | 3/2016 | Ng et al. | |
| 2016/0253651 A1* | 9/2016 | Park | G07F 9/023 705/39 |
| 2016/0302273 A1 | 10/2016 | Wee et al. | |
| 2016/0360594 A1 | 12/2016 | Chemel | |
| 2017/0102937 A1* | 4/2017 | Martin | G06F 8/65 |
| 2017/0111979 A1* | 4/2017 | Barna | H05B 37/0272 |
| 2017/0267175 A1 | 9/2017 | Ichikawa | |

FOREIGN PATENT DOCUMENTS

| | | |
|---|---|---|
| CN | 2349441 Y | 11/1999 |
| CN | 2356211 Y | 12/1999 |
| CN | 203104909 U | 7/2013 |
| DE | 202004004459 U1 | 8/2004 |
| DE | 102012210743 A1 | 1/2014 |
| EP | 0940904 A2 | 9/1999 |
| EP | 1035628 A1 | 9/2000 |
| EP | 1043826 A2 | 10/2000 |
| EP | 2242333 A1 | 10/2010 |
| GB | 2380620 A | 4/2003 |
| GB | 2494151 A | 3/2013 |
| WO | WO-2009104135 A1 | 8/2009 |
| WO | WO-2015108489 A1 | 7/2015 |
| WO | WO-2015177762 A2 | 11/2015 |
| WO | WO-2016003672 A1 | 1/2016 |
| WO | WO-2016054413 A1 | 4/2016 |

OTHER PUBLICATIONS

U.S. Department of Energy, LED Measurement Series: LED Luminaire Reliability, Oct. 2009, 4 pages, www.ssl.energy.gov.

Philips, Understanding power LED Lifetime analysis, Technology White Paper, Dec. 5, 2016, 11 pages, www.lrc.rpi.edu/programs/solidstate/assist/index.asp.

Kevin Dowling, PhD, Lumen Maintenance IESNA LM-80/2008, Oct. 30, 2008, 16 pages, www1.eere.energy.gov/buildings/publications/pdfs/ssl/lm80-webcast_10-30-08.pdf.

Jeff McCullough, LC, Pacific NW National Lab, Energy Star® Webinar:Requirements for Lumen Maintenance, Oct. 30, 2008, 18 pages, www1.eere.energy.gov/buildings/publications/pdf.

M-Cam Patently Obvious, Kodak's Final Gasp? Intellectual Property Analysis of Kodak v Apple, HTC, Jan. 13, 2012, 8 pages, http://www.globalinnovationcommons.org.

Claire Swedberg, IoT Lights Up Streets With Smart City Initiative, RFiD Journal, Jul. 23, 2015, 3 pages, http://www.iotjournal.com/articles/view?13303.

DALI, Discover DALI—Excellent System Performance, Mar. 31, 2014, 5 pages, http://dali-ag.org/discover-dali.html.

International Search Report and Written Opinion of International Application No. PCT/IB2017/051390, dated May 31, 2017, 13 pgs.

International Search Report and Written Opinion of International Application No. PCT/IB2017/051386, dated Jun. 6, 2017, 12 pgs.

International Search Report International App. No. PCT/IB2018/054387, dated Sep. 28, 2018, which is in the same family as U.S. Appl. No. 15/424,868, filed Feb. 5, 2017, 3 pgs.

Written Opinion of International App. No. PCT/IB2018/054387, dated Sep. 28, 2018, which is in the same family as U.S. Appl. No. 15/424,868, filed Feb. 5, 2017, 8 pgs.

* cited by examiner

END OF LIFE PREDICTION SYSTEM FOR LUMINAIRE DRIVERS

CROSS-REFERENCE TO RELATED APPLICATIONS

This application is a continuation-in-part of and claims priority to U.S. patent application Ser. No. 15/424,868 filed Feb. 5, 2017, which claims the benefit of U.S. Provisional Patent Application No. 62/445,669 filed Jan. 12, 2017 and is a continuation-in-part of and claims priority to U.S. patent application Ser. No. 15/360,879 filed Nov. 23, 2016, now U.S. Pat. No. 9,655,197, which claims the benefit of U.S. Provisional Patent Application No. 62/306,636 filed Mar. 11, 2016. This application claims the benefit of U.S. Provisional Patent Application No. 62/420,908 filed Nov. 11, 2016. The disclosures of all of the applications listed above are incorporated herein by reference in their entirety.

FIELD OF THE DISCLOSURE

Devices, systems, and methods for predicting end of life of electronic drivers are generally described. In particular, devices, systems, and methods for predicting the end of life expectancy of luminaire drivers and/or light emitting diode (LED) drivers are disclosed. For purposes of this disclosure, an electronic driver (or, simply "driver") for a luminaire/LED is generally one or more components configured to control, for example and without limitation, the power supply, dimming level, color temperature, and/or other operations of the luminaire/LED as described in the disclosure and known in the art. In the exemplary disclosed embodiments, a driver is a dimming control.

BACKGROUND OF THE DISCLOSURE

The lifetime of traditional light sources, such as, for example incandescent, fluorescent, and high-intensity discharge lamps, are estimated through industry-standard lamp rating procedures. Typically, a large, statistically significant sample of lamps is operated until about 50% have failed, which at that point, in terms of operating hours, defines a "rated life" for that lamp. Decrease in lumen output may occur as a lamp or light fixture operates over a long enough period of time. Based on years of experience with traditional light sources, lighting experts often use lamp life ratings, along with known lumen depreciation curves, to design the lighting for a desired space, and to determine re-lamping schedules and economic payback. This aspect of predictive life, half-life or end-of-life of a light source is not particularly true with LED, which can continue to operate at very low light levels and are at less risk of critical failure compared to traditional light sources. An LED's end-of-life may be measured in terms of lumen flux (i.e., the quantity of the energy of the light emitted per second in all directions) depreciation to a particular level as defined by manufacturers or by standard test methods.

LEDs usually do not fail abruptly like traditional light sources; instead, their light output slowly diminishes over time. Furthermore, LED light sources can have such long lives that life testing and acquiring real application data on long-term reliability becomes problematic—for example, new versions of products are often available before current ones can be fully tested. To add more to the challenge, LED light output and useful life are highly dependent on electrical and thermal conditions that are determined by the luminaire and system design. This conclusion is reflected in a Philips Technology White Paper, titled "Understanding power LED lifetime analysis," which may be found at www.lrc.edu/programs/solidstate/assist/index.asp (the "Philips paper").

According to the Alliance for Solid-State Illumination Systems and Technologies (ASSIST), the threshold at which human eyes may detect light output reduction is about 70% lumen maintenance. Further research conducted by ASSIST shows that a 30% reduction in light output may be acceptable to a majority of those who use luminaires (otherwise known as lighting devices or lighting fixtures and is defined as a complete electric light unit, which includes any sort of light source—incandescent, fluorescent, high-intensity discharge lamps, LEDs, and the like) in general lighting applications. However, ASSIST recommends considering both higher and lower figures for lumen maintenance for certain types of applications. These applications may include, for example, wall-washing application where lights may be seen by users side-by-side, which may require that the useful life of the lumen to be calculated on a higher figure, such as, typically 80% lumen maintenance. In some applications where light outputs are not critical, such as, for example, decorative light systems, lower lumen maintenance thresholds may be acceptable. ASSIST has proposed that two coordinates be used to express the useful lifetime of an LED component, or system $L_{70}$ and $L_{50}$. Rated lumen-maintenance life is measured in hours with associated percentage of light output, noted as $L_p$. In other words, $L_{70}$ of 30,000 hours means that the tested LEDs produce 70% of the initial light output at 30,000 hours. If an LED has $L_{50}$ of 30,000 hours, its lumen output decays faster than one with $L_{70}$ of 30,000 hours. Since the temperature of the device may impact these figures, thermal design of devices is critical but not necessarily enough to maintain lumen life absent other considerations. For example, dimming level and average power consumption of the lighting device, e.g., level of usage, may dictate its $L_{70}$ and $L_{50}$. Changes in power source current may also impact the $L_{50}$ of the LED device. The same may be true for constant current, where temperature variations will impact the $L_{50}$ number.

With reference to FIGS. 19 and 20, and further reference to the Philips paper, typical graphs of factors impacting LED lifetime are provided from the Philips paper. According to FIG. 19, if temperature is constant, changes in current will impact the L50 of the LED device. The same is true for constant current, (see FIG. 20, in this case 1.5 A), where temperature variations will impact the L50 number.

A disadvantage with current luminaire and/or LED systems and methods is that there is currently no standard format for reporting luminaire/LED lifetimes and/or lumen depreciation curves. According to a Paper published by the U.S. Department of Energy, titled "LED Luminaire Reliability," and retrievable from http://ephesuslighting.com/wp-content/uploads/2014/01/Fact-Sheet-LED-Luminaire-Reliability.pdf, "A test procedure currently in development by the Illuminating Engineering Society of North America (designated LM-80, IESNA Approved Method for Measuring Lumen Maintenance of LED Light Sources) will provide a common procedure for making lumen maintenance measurements at the LED device, array, or module levels". Further, the U.S. Department of Energy paper states: "The LM-80 test procedure addresses only one factor in the life of an LED luminaire—lumen depreciation of the LED device over the prescribed test period." For LED light sources, LM-80 defines lumen-maintenance life as "the elapsed operating time at which the specified percentage of the lumen depreciation or lumen maintenance is reached, expressed in hours." On the other hand, the rated lumen-maintenance life is defined as "the elapsed operating time over which an LED light source will maintain the percentage (p) of its initial light output" and is provided by the LED manufacturer. A disadvantage with this method is that there are usually many additional factors to consider when LEDs are installed in a luminaire or systems that can impact the rate of lumen depreciation or the likelihood of catastrophic failure, and this test method fails to address those additional factors. These additional factors may include, for example, environmental conditions of the environment in which the luminaire/LED is installed. The environment may be, for example and without limitation, a room, corridor, or other space in which light is required. Environmental conditions include temperature, humidity, barometric pressure, etc.

Other factors that can influence lumen maintenance are system conditions such as moisture incursion into electrical components, voltage or current fluctuations, failure of an LED driver or other electrical components, damage or degradation of the encapsulation material covering the LEDs, damage to the wire bonds that connect the LEDs to the fixture, and degradation of luminescent materials such as phosphors.

Since the emergence of LED lighting and its increased use in lighting applications, the lifetime of light sources has increased greatly, and lighting fixtures no longer require the old socket and bulb combination. Since LEDs are low-voltage light sources, they may require a constant Direct Current (DC) power supply (voltage and/or current) to operate at their optimal conditions. Operating at a low-voltage, the DC power supply acts as a barrier between an Alternating Current (AC) input and the LED. This barrier may increase the LED's resilience to different power levels and may help allow the LED safely withstand longer stand-by power. In a normal scenario, for example, individual LEDs may require 2V to 4V of DC power and several hundred milliamps (mA) of current to operate.

While LEDs may also help increase the lifetime of light sources greatly, the lifetime of the LEDs heavily depends on the driver because the driver will fail before the LED and the entire luminaire may then require replacement. Extending the life of the driver therefore extends the life of the LED and any other system components that would require replacement. For example, due to their physical makeup, LEDs must be protected from line-voltage fluctuations. Changes in voltage may produce a disproportional change in current, which in turn may cause light output to vary, particularly because LED light output is proportional to current and is rated for a current range. If current exceeds the manufacturer's recommendations, the LEDs can become brighter, which changes their color temperature, and results in faster degradation and a shorter useful life. The drivers used in luminaire and/or LED systems may be a crucial element in providing adequate protection from rapid and sudden voltage fluctuations in the LEDs by regulating the current that flows to the LEDs via converting incoming AC power to stable DC voltage during their operational period. Drivers may convert 120V (or 240V) or 60 Hz (50 Hz) AC power to low-voltage DC power required by the LEDs, and protect the LEDs from line-voltage fluctuations. Additionally, the drivers may be able to provide constant voltages, such as, 10V, 12V and 24V. The drivers may also be able to provide constant currents, such as 350 mA, 700 mA and 1 amp (A). Although there are some drivers that may be capable of operating with any commonly available LEDs, there are some drivers that are manufactured for use with only specific LEDs. For instance, some drivers may be designed to compressively fit inside a junction box, and may include isolated Class 2 output for safe handling of the load, operate at high system efficiency, and offer remote operation of the power supply.

The drivers used in luminaire and/or LED systems may enable dimming, color changing, and sequencing of, for example, LEDs in a constant and smooth manner. Since LEDs may be easily embedded with circuits that act as drivers to control dimming and color changing, these functions may respond to preset commands. Most of the drivers may be compatible with commercially available 0V-10V control devices and systems such as occupancy sensors, photocells, wall box dimmers, remote controls, architectural and theatrical controls, and building and lighting automation systems.

Due to the large business opportunity in the LED enabled lighting technology market, there are a large number of LED manufacturing companies, each having their own specially designed drivers for use with related luminaires/LEDs and associated equipment. These companies may provide a nonstandard set of specifications that define normal operational ranges for the LEDs and the drivers. These specifications, in most cases, include the maximum temperature the driver can sustain to keep the LEDs operational, the maximum number of ON/OFF cycles the driver can withstand before it fails, the maximum voltage level the drivers can handle, etc. In many cases, the manufacturer may disclose prediction curves related to different characteristics of each of the drivers.

Driver reliability and lifetime may be linked to the operation temperature to which the driver is subjected as shown in the chart in FIG. 21. For each driver, manufacturers may provide/state an allowable ambient temperature operating range (ta) and a maximum capacitor temperature (tc) for the driver. The ambient temperature is typically in the range of about −20° C. to about +60° C. The capacitor temperature may sometimes be referred to as "case temperature" and is usually an alternative to measuring the ambient temperature. The case temperature may allow a more accurate reading of the temperature of the components within the driver, and may make it easier for customers and/or end users of the driver to test the capacitor temperature without having to disassemble and/or open the driver. The manufacturers of the drivers may also provide the maximum temperature to which output capacitors located on the driver can be subjected. The output capacitor is one component that may limit life span of the driver due to the capacitor type used at the output phase, such as, for example, an aluminum electrolytic capacitor.

Numerous luminaire drivers may use aluminum electrolytic capacitors as part of the output phase circuit to reduce the ripples in current supplied to the LEDs. It is believed that increasing the output capacitance will reduce the ripple current. On the other hand, a failure of an aluminum electrolytic capacitor may result in decreased output of its capacitance and a corresponding increase in ripple current. For example, a 50% reduction in performance of the output capacitor can result in double (two-fold) the amount of ripples (changes) in the current that is being supplied to the LED by its defective driver.

Aluminum electrolytic capacitors are typically made up of three layers: 1) an anode aluminum foil that is etched and covered with an aluminum oxide, 2) a spacer made of paper that is saturated in electrolyte; and 3) a cathode aluminum foil. A primary cause of reduction in capacitor performance is heat, because raised/increased temperatures may lead to drying out of the capacitor. FIG. 22 is an exemplary chart showing the degradation of an aluminum electrolytic capacitor life as a function of capacitor temperature in different brands/types of capacitors represented by the red, blue, and green lines. The causes of temperature increases within the capacitor include over-volting the capacitor, which may be caused by poor circuit design, and exposing the capacitor to high ambient temperature. In some instances, over-volting a capacitor leads to catastrophic failure.

Other factors that may affect the lifespan of a driver are, e.g., the number of ON/OFF and/or dimming cycles, the amount of current used by the luminaire and/or driver, and the applied voltage at the luminaire and/or driver. FIG. 23 illustrates a diagram of the dimming level and associated power consumption of a luminaire over time, and may be used to predict which luminaires are likely to fail based on the manufacturer's data regarding cycles, voltage, current, etc.

The effect of switching cycles, that is, turning the current on/off, in drivers may be solely dependent on the luminaire driver itself. While a minimum standard criterion is set for driver manufacturers to achieve, manufacturers may provide their own specifications that are usually supported by long-term testing of their products. A disadvantage with use of switching cycles, is that they may often introduce negative effects on the drivers due to thermal shock on the capacitors and inrush current/input surge current.

Many of the challenges with the luminaire and/or LED drivers may be due to the installation environment and wrong installation set-ups. For example, when there are not enough drivers to support the number of LEDs linked/coupled together to create a lighting environment, there may be a high load on the drivers. If a wrong driver is selected, the driver will need to operate outside its recommended limits. In addition, if the LED is placed in a cold environment, it will draw more power, which may lead to rapid reduction of the life cycle of the LED.

A need exists for a solution for proper handling of LED and luminaire drivers, and proper enhancement of useful life span of LED and luminaire drivers. Furthermore, while manufacturers are making state of the art LEDs and their different components, including the drivers, there remains a need for a clear and/or embedded solution that can predict the half-life of the luminaire and/or LED system in advance. While effective manufacturing processes, installation, and use of LED systems may help dictate its half-life, the half-life is not well predicted. Therefore, there is a need for a system and a method to predict the half-life and/or end of life for the drivers and LEDs, and that is fully integrated and constantly monitors failure indications, prior to a failure occurrence in the LED system. Further, there is a need for a system that monitors multiple variables of luminaire and/or LED drivers, as well as the LED light intensity depreciation of LEDs, and combines the results in a single system to ensure that the shortest half-life prediction of the LED and/or luminaire driver is known.

Considering the above background, devices, systems, and methods that are enabled by technologies local to a luminaire/LED, or by Internet of Things (IoT) networks and servers, are disclosed to provide an accurate and cost effective solution for predicting the half-life of luminaire/LED lighting systems, including drivers, and maximizing the useful life of such lighting systems.

BRIEF DESCRIPTION OF THE EXEMPLARY EMBODIMENTS

This disclosure relates, among other things, to devices, systems, and methods for predicting half-life and/or lifetime expectancy of luminaire/LED drivers used in lighting systems. According to an aspect, the system is configured for predicting a half-life expectancy of at least one driver. The system may include at least one gateway configured to control dimming levels of one or more lighting devices such as luminaires having one or more LEDs, and a plurality of luminaires configured to communicate with the at least one gateway via at least one dimming control interface. In an exemplary embodiment, the plurality of luminaires include the at least one driver. According to an aspect, the system further includes at least one sensor subsystem configured to sense a plurality of color channels and monitor at least one change in the environment in which the system is installed in real time, and at least one power meter configured to measure power in real time. The at least one sensor subsystem and the at least one power meter may each be connected with the at least one gateway along with the plurality of luminaires. According to an aspect, the system further includes at least one server configured to calculate and predict depreciation of the dimming levels of the plurality of luminaires. The sensor may be configured to report and change status information associated with the plurality of luminaires displayed at a display device. In an embodiment, the at least one server is connected with the gateway via at least one of a wired connection and a wireless connection.

In one aspect, the disclosure is directed to a method of predicting a half-life expectancy of at least one driver. The method may include fetching by at least one gateway information regarding the associated luminaire(s) from the at least one driver embedded inside the associated luminaires. According to an aspect, the method further includes forwarding by the at least one gateway the information regarding the luminaires from the gateway to the at least one server, and comparing by the at least one server the information received from the gateway with information provided by a manufacturer of the at least one driver embedded inside the plurality of luminaires. The method may also include predicting by the at least one server a half-life depreciation/end-of life for the at least one driver embedded inside the plurality of luminaires based at least in part on the comparison.

BRIEF DESCRIPTION OF THE DRAWINGS

The above and still further features and advantages of embodiments of the disclosure will become apparent upon consideration of the following detailed description of embodiments thereof, especially when taken in conjunction with the accompanying drawings, and wherein.

Figure 1:
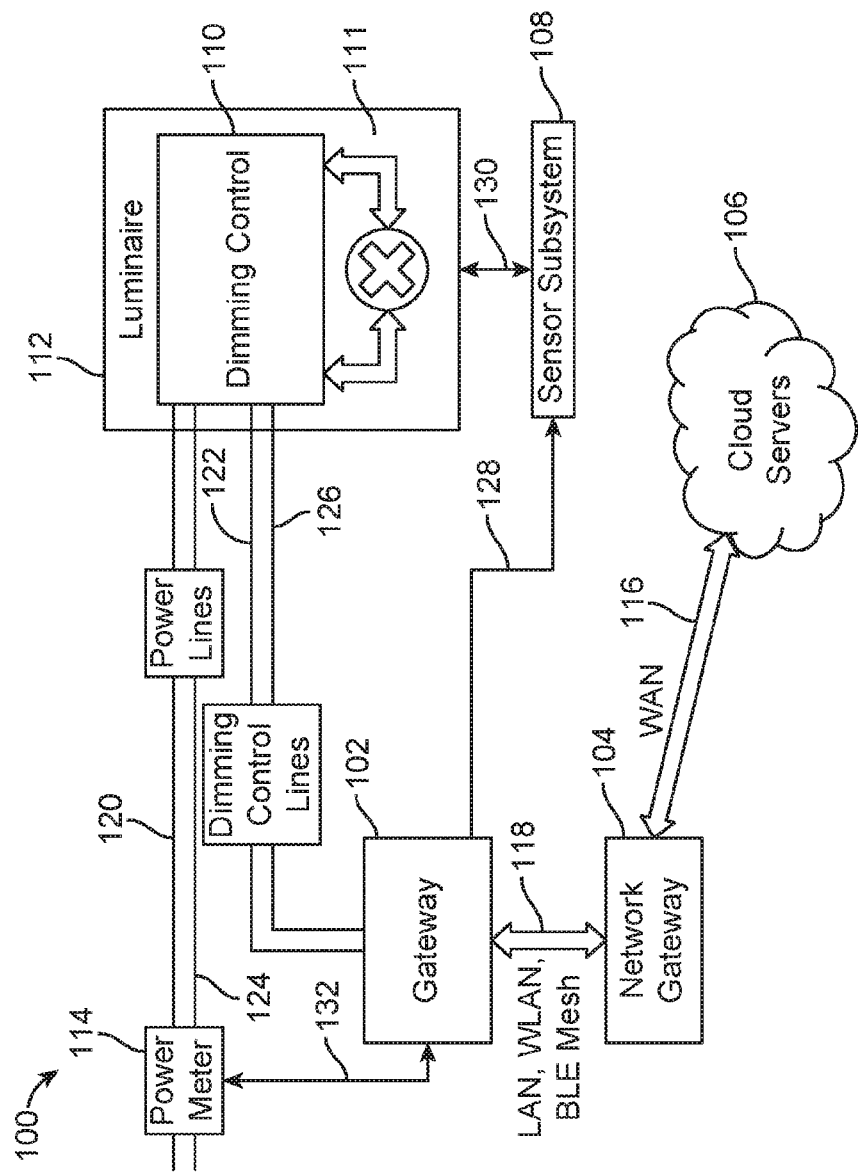
FIG. 1 illustrates a high-level system diagram of a system, according to an aspect.

Various features, aspects, and advantages of the embodiments will become more apparent from the following detailed description, along with the accompanying figures in which like numerals represent like components throughout the figures and text. The various described features are not necessarily drawn to scale, but are drawn to emphasize specific features relevant to some embodiments.

The headings used herein are for organizational purposes only and are not meant to be used to limit the scope of the description or the claims. To facilitate understanding, reference numerals have been used, where possible, to designate like elements common to the figures.

DETAILED DESCRIPTION OF THE EXEMPLARY EMBODIMENTS

Although an electronic driver is primarily used for LED fixtures, the disclosure is applicable to any electronic driver for light fixtures that utilizes an electrolytic capacitor or other known electronic drivers consistent with the scope of the disclosure.

The term "module" as used herein refers to any known or later developed hardware, software, firmware, artificial intelligence, fuzzy logic, or combination of hardware and software that is capable of performing the functionality associated with that element. Also, while the disclosure is described in terms of exemplary embodiments, it should be appreciated those individual aspects of the disclosure can be separately claimed.

The term "computer-readable medium" as used herein refers to any tangible storage and/or transmission medium that participates in storing and/or providing instructions to a processor for execution. Such a medium may take many forms, including but not limited to non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and known equivalents and successor media, in which the software implementations of the disclosure are stored.

FIG. 1 depicts an exemplary embodiment of a system 100 for predicting end of life for luminaire drivers according to the disclosure. FIG. 1 illustrates the system 100 including the gateway 102, a luminaire 112, and a driver/dimming control 110. Gateway 102 is a Universal Smart Lighting Gateway (USLG) in the exemplary embodiment shown in FIG. 1. According to an aspect, luminaire 112 is a system that may include a single luminaire 112 or multiple luminaires 112 connected with a single common interface to power lines 120, 124 and dimming control lines 122, 126. The driver may be included as a part of/within the luminaire 112, e.g., as dimming control 110. Embodiments in accordance with the disclosure do not limit the type of hardware/wire/bus or wireless interfaces between the gateway 102 and the dimming control 110, e.g., the number and type of wires or bus connectors or the wireless communication protocol. The connections can be as simple as analog interface control wires and/or electrical/digital bus connectors, of any kind. According to the exemplary embodiment shown in FIG. 1, a power meter 114 is also connected electrically between the gateway 102 and the luminaire 112 via the power lines 120, 124. The power meter 114 may be connected to the gateway 102 via the power meter interface 132 as discussed further below with respect to FIGS. 2 and 9.

The gateway 102 is configured to control at least one of a dimming level and dimming control protocol of the luminaire 112 via dimming control 110. The gateway 102 may contain built-in software implementations of the dimming protocols (see FIG. 2) and/or the cloud server 106 is configured to control the gateway 102 and provide to the gateway 102, for example, instructions regarding setting/adjusting the dimming level of the luminaire 112, a dimming schedule for the luminaire 112, and/or a dimming control protocol for the luminaire 112.

Further, the exemplary system monitors and maintains a dimming level of the luminaire 112 such that the luminaire driver (dimming control 110 in the exemplary embodiment shown in FIG. 1) temperature is at least 10° C. below the maximum temperature rating for the specific luminaire driver. This operation extends the time between failures of the luminaire driver. In addition, the cloud server 106 and/or gateway 102 may adjust the dimming level of the luminaire 112 to extend the half-life/end of life expectancy of the driver as described further below with respect to the exemplary disclosed method of predicting a half-life or end of life for a driver.

Figure 3:
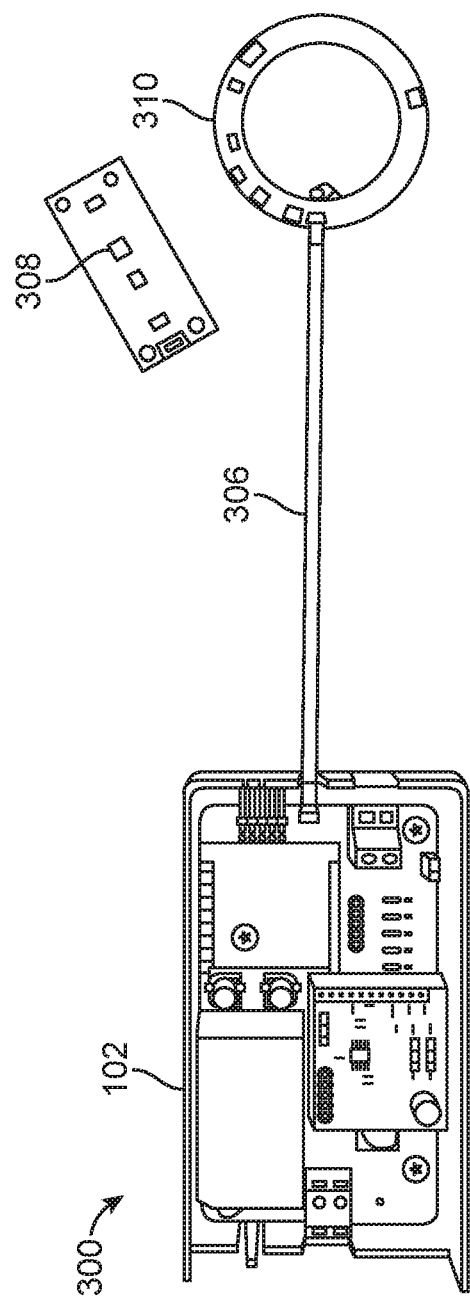
FIG. 3 illustrates a diagram of a sensor connection to a luminaire, according to an aspect.

As further shown in FIG. 1, the exemplary system 100 includes a sensor subsystem 108 that connects via a connection 130 to the luminaire 112 on one side and to the gateway 102 via a sensor interface 128 on the other side. The connection 130 to the luminaire 112 may be a physical or wireless connection and is not limited to a specific location or communication protocol. Embodiments in accordance with the disclosure do not limit the type of hardware/wire/bus or wireless interfaces between the gateway 102 and the sensor subsystem 108, e.g., the number and type of wires or bus connectors or the wireless communication protocol. The connections can be as simple as analog interface control wires and/or electrical/digital bus connectors, of any kind. The location of the sensor subsystem 108 may be different for various types of sensors and luminaires depending on the orientations required for different applications. As seen in FIG. 3, for instance, physical sensor interfaces and connections (e.g., 306), discussed further below, may include the sensor interface 128 connected to the gateway 102.

According to an aspect, and with further reference to FIG. 1, the system 100 includes a backhaul interface 118 connected to the gateway 102 and a network gateway 104. The backhaul interface 118 may be wired or a wireless Local Area Network (LAN/WLAN), including possibly one or more of Mesh Bluetooth Low Energy (Mesh BLE), ZigBee, and/or Ethernet LAN, etc. In an exemplary embodiment, the backhaul interface 118 is Mesh BLE. According to an aspect, the gateway 102 is connected with the network gateway 104 which resides between the local networks and a wide area network (WAN) 116. In an embodiment, the WAN 116 connects the gateway 102 to cloud computers/servers 106 for operational and management interfaces.

Figure 2:
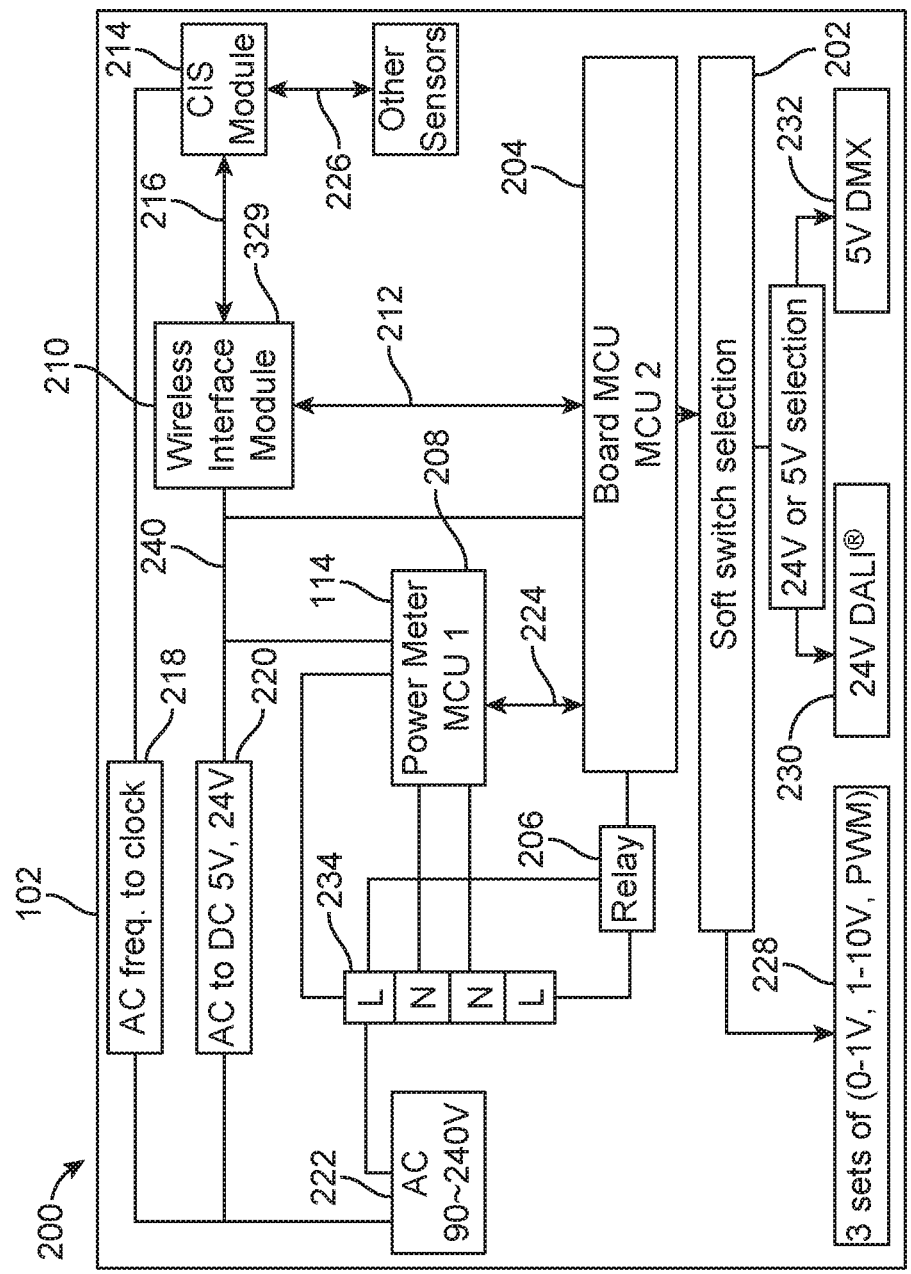
FIG. 2 illustrates a gateway box diagram, according to an aspect.

FIG. 2 depicts an illustrative embodiment of the gateway 102. According to an aspect, a soft switch 202 to select between different electrical dimming interfaces is provided. The soft switch 202 may be actively used to search for the correct protocol between the gateway 102 and the luminaire 112 in embodiments where the luminaire 112 is a dimming luminaire 112. According to an aspect, protocol modules 228, 230, and 232 are the software implementation of the dimming interfaces that reside in the gateway 102. In an embodiment, the supported dimming protocol includes several sets of protocols, such as, for example, 0V-10V, 1V-10V, pulse width modulation (PWM) 228 protocols over 0V-10V and/or 1V to 10V, a 24V Digital Addressable Light Interface (DALI)® 230 protocol, and a 5V DMX 232 protocol. The protocols may include algorithms that are implemented in a Micro Controller Unit 2 (MCU 2) 204. According to an embodiment, the MCU 2 204 is powered by the AC to DC 5V, 24V 220 via a power line connection 240. MCU 2 204 may also be connected to a power meter 114 via a Micro Controller Unit 1 (MCU 1) 208 and a Universal Asynchronous Receiver/Transmitter 224 (UART 224). MCU 2 may also be connected to a Relay 206 and/or a Wireless Interface Module (WIM) 210 via a Serial Peripheral Interface (SPI) bus 212. In an embodiment, the MCU 2 204 also controls the Relay 206, which may be designed to cut off/block the current to the luminaire 112 upon a decision by the MCU 2 204. The power cutoff can be used to disconnect power from the controlled luminaire 112 subsystem. In an exemplary embodiment, the WIM 210 is implemented as a Bluetooth Low Power (BLE) device using Mesh BLE protocol to connect with other devices, as well as having the SPI bus 212 and an Inter-Integrated Circuit two-wire serial interface bus (TWSI) 216. The WIM 210 may be connected to a sensor subsystem that may include a Camera Interface System (CIS) 214, which may include, for instance, an environment sensor and a Red, Green, Blue (RGB) sensor and/or Yellow, Red, Green, Blue (YRGB) sensor combination device, and other sensors, as discussed further below. The CIS module 214 can be extended via a TWSI bus 226 with other sensor modules. The CIS module 214 may require a clock, which is received via the AC Frequency to a clock module interface 218. The WIM 210 may require power, which may be received via the AC to DC 5V to 24V 220 via power interface line 240. According to an aspect, an AC Power 90V-240V 222 may be relayed to the MCU 2 204 via a Line Control (LNNL) 234, and relayed from the soft switch 202 for power selection for the dimming protocol interfaces. The AC Power module 222 may also be relayed to the power meter 114 via the LNNL 234, which measures all power delivered to the luminaire 112. The LNNL 234 illustrated in FIG. 2 and according to an aspect, depicts the physical electrical line connections.

According to an aspect and as illustrated in FIG. 3, the system 300 may include one or more sensors, typically configured as CIS modules, connected to the gateway 102. FIG. 3 illustrates an exemplary embodiment that includes at least one of a first CIS module 308 and a second CIS module 310. While only one connection is depicted in FIG. 3, one or both CIS modules 308, 310 may include a physical interface with the gateway 102 via a TWSI connection that uses a 6 or 8 pin FPC cable and connector 306, or may be in wireless communication with the gateway 102 using, for example, Mesh BLE. The CIS modules 308, 310 may also be physically connected to the luminaire 112. According to an aspect, the CIS module 308 is a linear module that can be adapted to fit on devices that require a linear fitting. In an embodiment, the CIS module 310 is circular, and may be designed to fit circular-shaped luminaires 112.

In an embodiment, each of the CIS 308 and 310 may be provided with at least two or more sensors forming part of the sensor subsystem 108. One sensor is an environment sensor dedicated to sensing parameters of the environment in which the luminaire 112 or other components of the system 100 are installed. In an exemplary embodiment, the environment sensor is configured to face away and/or extend in a downwardly fashion from the luminaire 112. A second sensor may be a color sensor, for example a Red Green Blue (RGB) sensor or a Yellow Red Green Blue (YRGB) sensor, configured to face in an upward direction towards the luminaire 112 directly. The combination of the environment sensor and the color/RGB sensor may be combined into a single ASIC or may be arranged as a set of separate devices. According to an aspect, the sensors may also connect with the gateway 102 via wired or wireless connections. Any or all of the sensors may also provide real time measurements and assessments to the gateway 102. In response to the measurements and assessments from the sensors, the gateway 102 may direct the dimming control 110 to change a dimming level and/or a color temperature, and RGB/RGBW (Red Green Blue Warm White) color, of a luminaire 112 that allows for color temperature and RGB/RGBW color control, to maintain a luminous intensity or color temperature in view of light output from the luminaire 112 or environmental factors that affect the intensity or color temperature.

According to an aspect, the system 100 includes an upward facing sensor such as an RGB sensor directly facing the luminaire 112. The RGB sensor may measure both the color/RGB content of a light source and the color/RGB intensity of the light source. According to an aspect, the RGB sensor or combination of sensors is configured to measure multiple color channels (e.g., Red, Green, Blue, and/or Yellow in certain embodiments) as they directly face the luminaires 112.

The environment sensor may be a low resolution imaging sensor, such as an array of sensors combined into a low resolution imaging device or into a single ASIC that also functions as an imaging sensor. According to an aspect, the imaging sensor measures environmental parameters and faces away from the luminaires 112 to monitor the environment of the light source. According to an exemplary embodiment, the environment sensor includes at least three different types of sensors including a low-resolution image sensor, an ambient light sensor, and a temperature sensor. Other embodiments may include more and/or other types of environment sensors. In the exemplary or other embodiments, the environment sensor is a single sensor ASIC. The environment sensor may be any sensor that is capable of collecting information regarding the environment in which the luminaire 112 or other components of the lighting system are installed.

Figure 4:
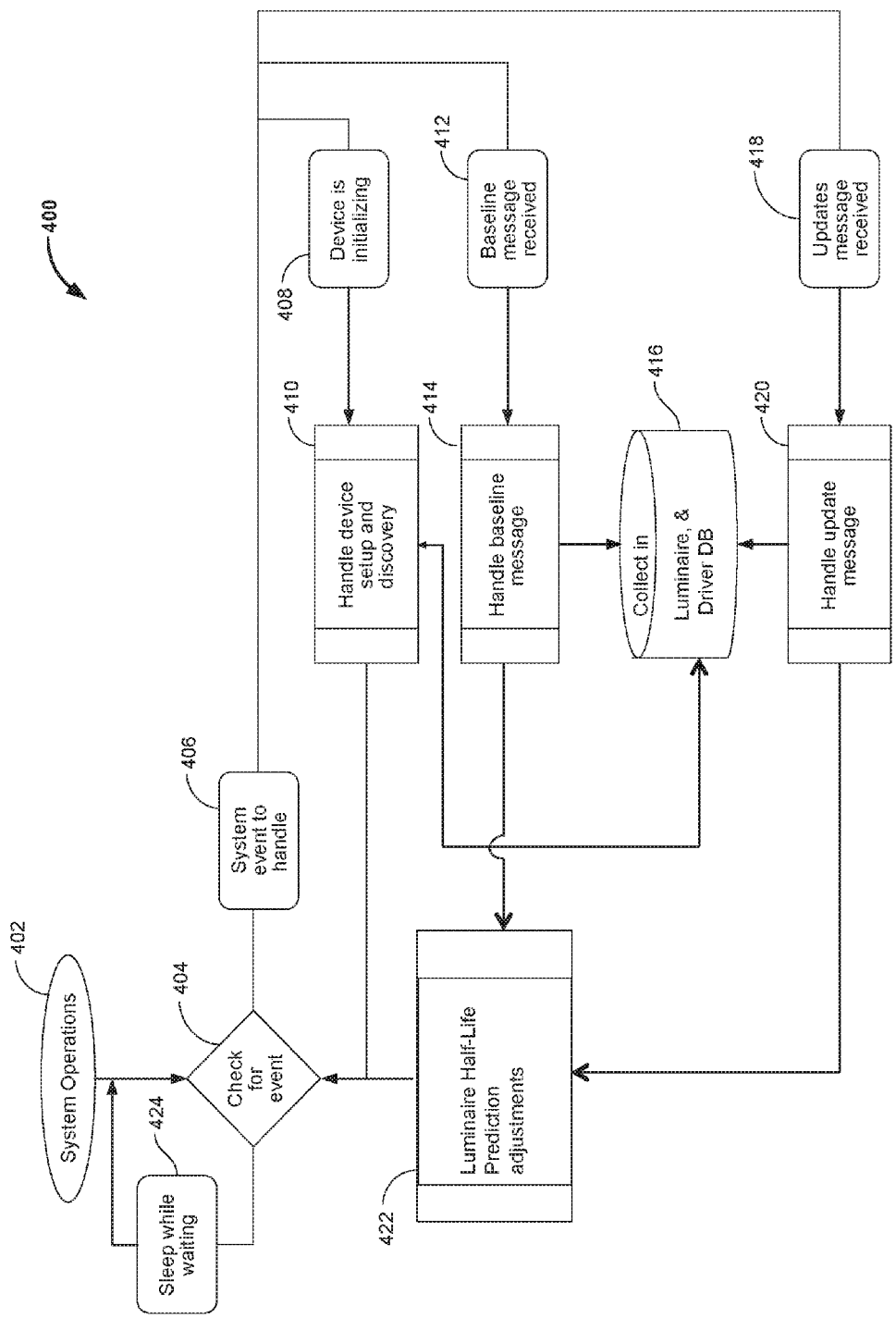
FIG. 4 illustrates a flow chart of a system handling a procedural global event, according to an aspect.
Figure 5:
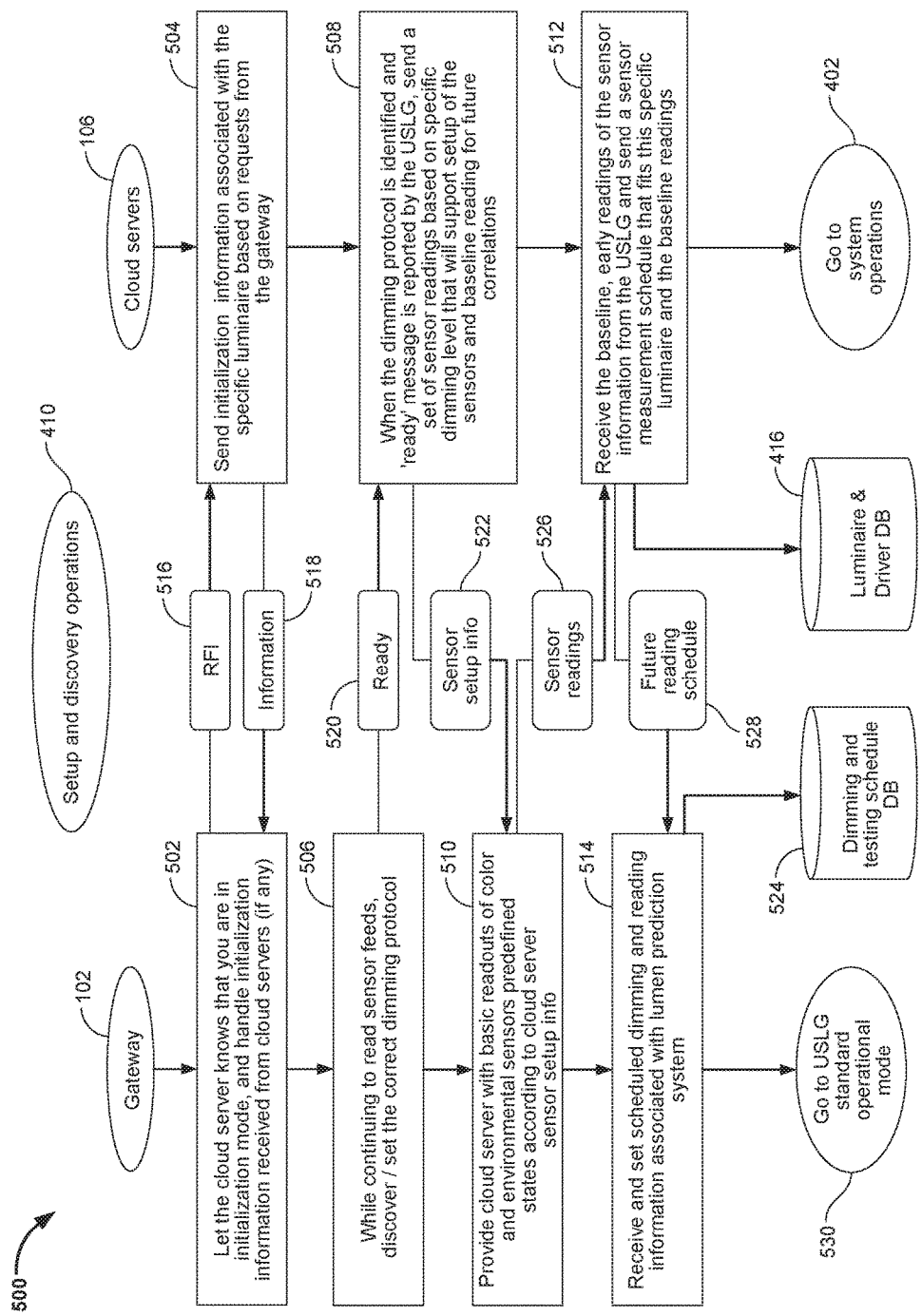
FIG. 5 illustrates a flow chart of a device setup and discovery stage of a system, according to an aspect.
Figure 6:
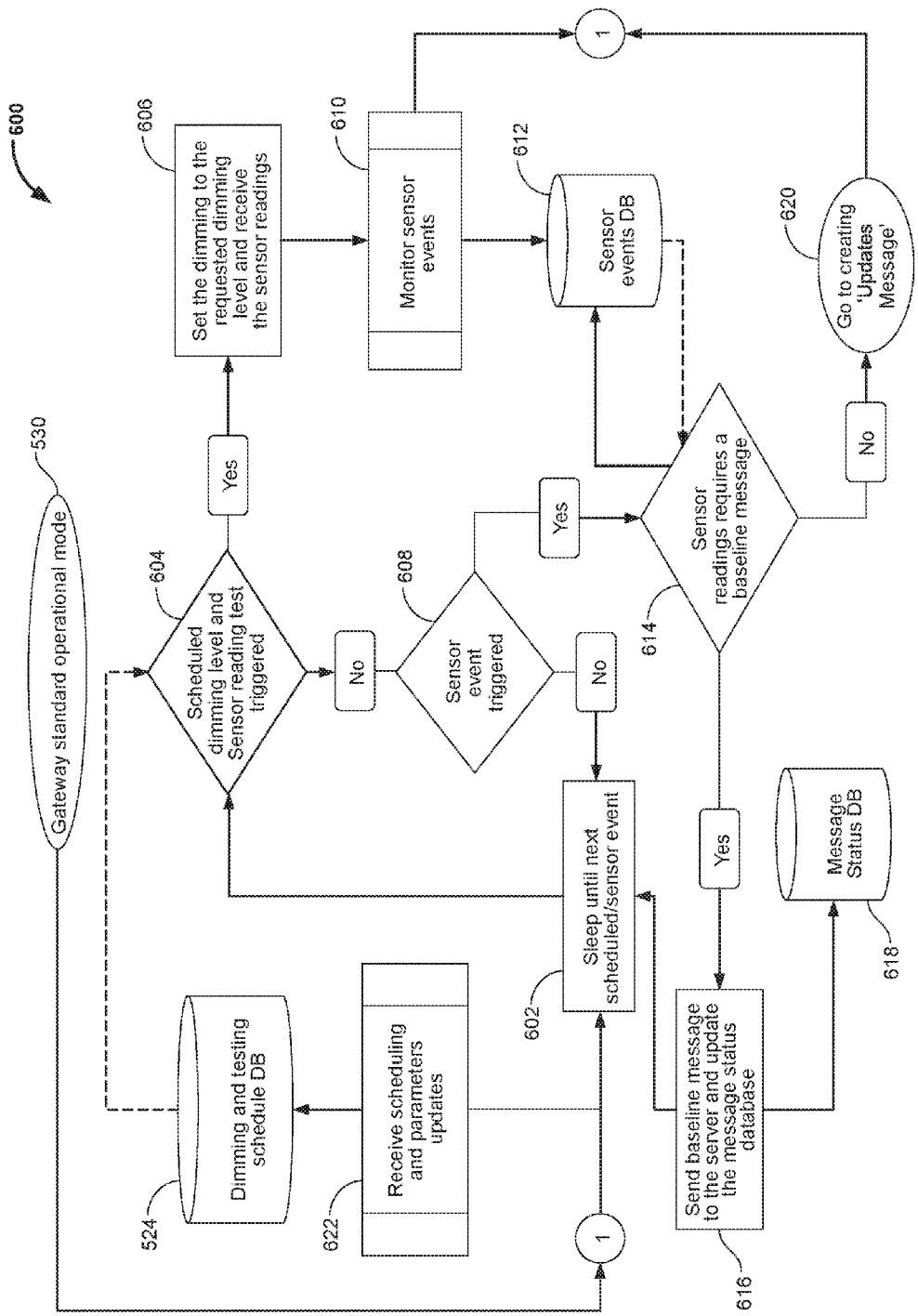
FIG. 6 illustrates a flow chart of a system handling a gateway Standard Operational Mode, according to an aspect.
Figure 7:
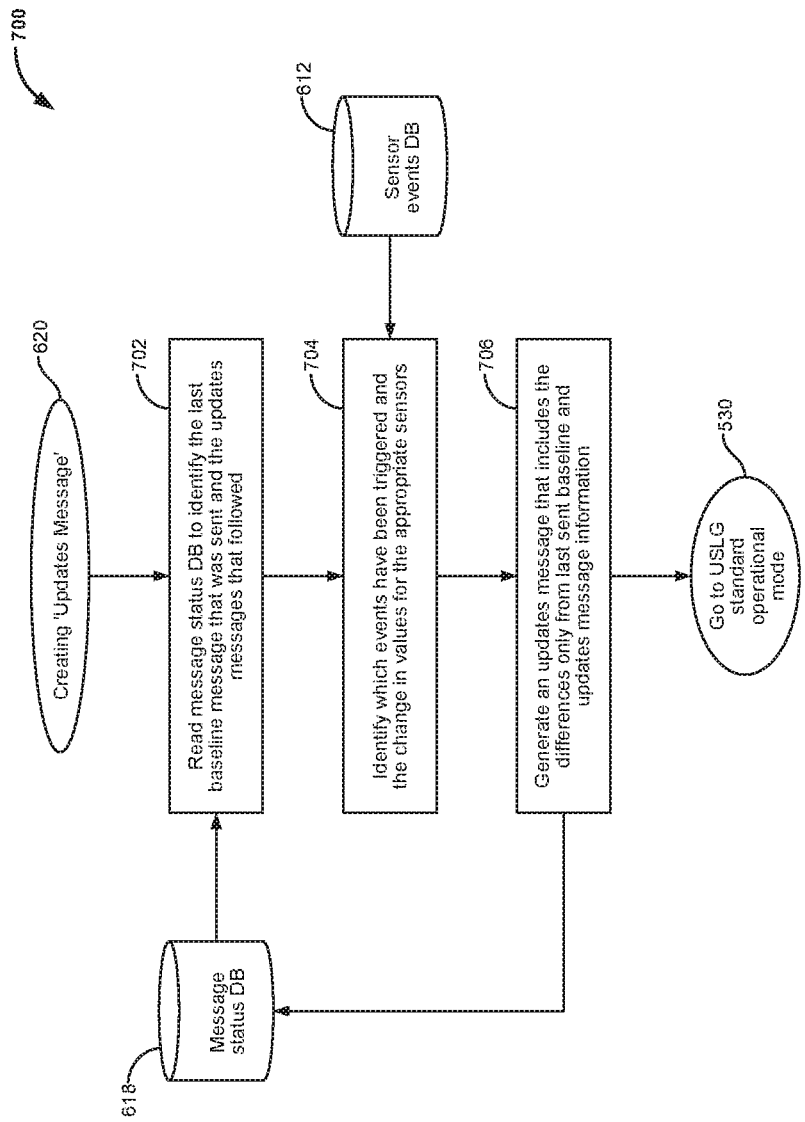
FIG. 7 illustrates a flow chart of a system creating an 'Updates Message', according to an aspect.

FIG. 4 illustrates an exemplary embodiment of a configuration 400 of a high level operation of the system 100. According to an aspect, the cloud server 106 is in a reactive mode, during which it waits for events to occur. During the reactive mode, the cloud server 106 may be in sleep mode. At step 402, the cloud server 106 periodically wakes up to check if an event exists. According to an aspect, and as illustrated in FIG. 4, three different types of events may exist, including a Device is Initializing 408 event, a Baseline message received 412 event, and an Updates messages received 418 event. The Device is initializing 408 may be the first event, and may be handled by a "handling device setup messages and discovery" 410 process (FIG. 5). The Baseline message received 412 may be the second type of event (FIG. 6) and may be handled by "a Handle baseline message" 414 process. Finally, the Updates messages received 418 event may be the third type of event, and may be handled by a "Handle Updates message" 420 process (FIG. 7).

In the exemplary embodiment shown in FIG. 4, after handling incoming messages of any type, e.g., Baseline Messages or Updates Messages, the measurement updates or changes (discussed further below with respect to FIGS. 6, 7, and 10) are recorded in a Luminaire and Driver Database (DB) 416. As illustrated in FIG. 6 and according to an aspect, the handling of device setup and discovery may also be recorded in the Luminaire and Driver DB 416. After handling at least one of the Baseline 412 and the Updates 418 messages, the system 100 may predict the end of life of the luminaire 112 and/or the dimming control (driver) 110. In an exemplary embodiment, after handling at least one of the Baseline 412 and the Updates 418 messages, the system 100 adjusts the current driver end of life predictions 422. The changes in the dimming schedule of any luminaire 112 and/or the dimming control 110 will impact its life expectancy. Over time and based on usage, the predictions 422 may change and help facilitate measurements that are taken in real time, and may therefore help to provide more specific point-in-time prediction of the end of life of luminaire 112 and/or the dimming control (driver) 110. In addition, the predictions 422 may be used to calculate a dimming level for the luminaire 112 that meets minimum light intensity requirements while extending the useful life of the luminaire 112.

With continuing reference to FIG. 4, if there are no events that need to be handled by the system 100, the operation may go to step 424, during which the system 100 enters sleep mode. If there are events which need to be handled by the system 100, the operation may proceed/go to step 406 and then to one of step 408, 412, or 418 depending on the type of event as described above.

The baseline messages are collected in a Luminaire & Driver DB 416. At step 422, the baseline messages are used to predict end-of-life requirements for the luminaires 112. At step 418, the system 100 may recognize a third and final event type, which may be the Updates message 418 event, and goes to step 420. At step 420, the system 100 handles Updates messages 418 and then forwards the Updates messages 418 towards the Luminaire and Driver DB 416 and step 422. The Updates messages 418 are received and recorded at the Luminaire and Driver DB 416. At step 422, the Updates messages received may be used to update the end-of-life prediction and requirements for the luminaires 112.

As illustrated in FIG. 5, the system depicts an exemplary configuration 500 of the system 100 handling device setup and discovery operations.

According to an aspect, the first event after turning on the gateway 102 includes a request for information (RFI) 516 from the gateway 102 to the cloud server 106. This may include asking the cloud server 106 to provide minimal initialization information 518. In an embodiment, if the cloud server 106 is already familiar with the controlled luminaire 112 by this gateway 102, the cloud server 106 may provide more information 518 based on this knowledge/familiarity with the controlled luminaire 112. The cloud server 106 may return an information (Information) message 518 to the gateway 102. The types of information messages 518 are not limited by this disclosure. For instance, the information message 518 can include controls that prevent a complete OFF state of the luminaire 112, and forces the system 100 to use, instead, a low dimming level. The gateway 102 may set the appropriate dimming protocol for the luminaire 112 and may send a ready (Ready) message 520 to the cloud server 106. According to an aspect, the Ready message 520 includes identifying the luminaire 112, and identifying the luminaire's 112 dimming protocol and sensor information as collected during the dimming protocol test/discovery 506 by the gateway 102. The cloud server 106 may respond with the dimming and sensor information (Sensor setup 522 associated with the setup of the sensors for both baseline and for tune-up of the luminaire 112. According to an aspect, the gateway 102 sets the luminaire 112 to pre-defined states and collects the readings of the sensors 510. The pre-defined states may include the power levels, voltages, and ampere levels provided by the manufacturer of the luminaire 112 and/or the luminaire drivers 110. The information collected from the sensors may be sent to the cloud server 106 as part of a 'Sensor Readings' message 526. According to an aspect, the cloud server 106 then sends back final tune-up information and a schedule for dimming and taking measurements, which may need to be done on a regular basis (e.g., according to the Future Reading Schedule) 528/at regular time intervals. The cloud server 106 may update the Luminaire and Driver DB 416 and continue to System Operations 402. According to an aspect, the gateway 102 records the scheduling information in the Dimming & Testing Schedule Database 524 and continues to a Standard Operational Mode 530. Changes in the dimming schedule of any luminaire 112 and/or the luminaire dimming control 110 may impact the luminaire's 112/the luminaire driver's 110 end-of-life/life expectancy. Additionally, the system 100 can use the dimming levels to control ON/OFF stages and gradual timing of ON/OFF stages of the luminaire 112; therefore, over time and based on usage of the luminaire 112, the end-of-life/life expectancy predictions may change and become more accurate to the specific point-in-time of the measurements.

The effect of ON/OFF switching cycles on a luminaire driver varies between different luminaire drivers. From the perspective of lumen emission, there is no difference between switching off a luminaire driver or maintaining the driver input voltage at zero volts or close to zero volts. The exemplary embodiments translate 'power OFF' requests into a function that maintains lowest possible voltage input to the luminaire driver, which, from a user perspective, will drive the lumen level down to close to zero while maintaining some level of charge on the aluminum capacitor and reducing the effects of rush-in current (thermal shock) on the capacitors when the LED is switched on.

The exemplary embodiments also monitor and mark the times and dates when the rates of ON/OFF switching are high or low for one or more luminaires and/or luminaire drivers. In such fashion, the dimming level of a luminaire can be set to close to 0 instead of completely OFF at times of expected/predicted high ON/OFF switching rates. In an exemplary embodiment, the system provides the option of warming up luminaire drivers before an expected period of high ON/OFF rates. The warming up method involves turning those luminaires ON at a very low current, to allow the capacitors to warm up. The system will do so several minutes before the actual high use time is expected. This may extend the life of the luminaire driver and prevent thermal shock effects.

In an exemplary embodiment, the system also uses the dimming schedule to handle the minimal power level assigned to the luminaire when the luminaire is turned off. Using the dimming protocol setup allows for seamless handling of both on and off effects on the driver. In the same or other embodiments, the setup of the specific ON/OFF behavior is set up in the cloud server and is sent to every gateway in the system such that the ON or OFF commands are interpreted consistently with the plurality of dimming protocols associated with a plurality of luminaires.

With continuing reference to FIG. 5, at step 502, gateway 102 sends the RFI message towards the cloud servers 106. The gateway 102 may ask the cloud servers 106 to provide minimal initialization information. According to an aspect, if the cloud servers 106 are already familiar with the controlled luminaire 112, the cloud severs 106 may provide more information based on this knowledge. At step 504, the cloud server 106 returns initialization information associated with the controlled luminaire 112 towards the gateway 102. At step 506, the gateway 102, while continuing to read the sensor feeds, sets an appropriate dimming protocol for the luminaire 112, and then transmits a Ready message 520 towards the cloud server 106. In an embodiment, the Ready message 520 includes identifying the luminaire 112, the luminaire's dimming protocol, and the luminaire's sensor information, each of which were collected during the gateway's 102 dimming protocol test/discovery. At step 508, after receiving the Ready messages 520, the cloud servers 106 may respond with the 'Sensor Setup info' 522 including, e.g., dimming and sensor information. According to an aspect, the dimming and sensor information are associated with the setup of the sensors for the baseline messages and for tune-up. At step 510, the gateway 102 sets the luminaire 112 to the pre-defined states, collects the readings of the sensors and then forwards that information towards the cloud servers 106 as part of a Sensor Readings messages 526. At step 512, the cloud servers 106 may send final tune-up information, a dimming schedule, and a sensor measurements Future Reading Schedule 528 that needs to be performed by the system 100 (see, for example, FIG. 4). At step 512, the cloud servers 106 may also update the Luminaire & Driver DB 416 and continue to system operations 402. At step 514, the gateway 102 receives the dimming and reading schedule from the cloud servers 106, records them in the Dimming & Testing Schedule DB 524, and continues to a USLG/gateway Standard Operational Mode 530.

FIG. 6 illustrates an embodiment 600 of the handling of the gateway Standard Operational Mode 530. In an embodiment, the gateway 102 may spend most of its time in a sleep mode 602 while waiting for a scheduled dimming control or sensor reading to occur according the dimming and sensor reading schedule (from Dimming & Testing Schedule DB 524). If the scheduled action is Schedule Test Triggered 604, for example, the gateway 102 may, at a specific time, set a specific dimming level, and wait for the set of sensor readings 606. If the scheduled action is "Sensor or Driver Reading Triggered 608", the gateway 102 may conduct/set sensor readings for, for example, the RGB sensor readings and/or environment sensor readings, which may be present and need to be read and processed. According to an aspect of the exemplary embodiment, monitoring of the sensor events at 610 occurs in parallel (i.e., in the background) while the gateway 102 is in sleep mode.

In an exemplary embodiment, the gateway 102 does not process or handle tasks that are not scheduled. The gateway 102 will only process scheduled tasks and will remain in a sleep mode 602 unless a scheduled dimming or sensor action exists. The scheduled tasks can be, for example and without limitation, setting a new dimming level 606 and waiting for sensor events (e.g., 412, 418) 610 and/or taking one or more sensor or driver readings 608. According to an aspect, after the initialization 408 of the gateway 102, the gateway 102 receives a scheduling message 514 from the cloud servers 106. At step 604, for instance, the gateway 102 may set parameters to populate the Dimming and Testing Schedule DB 524. According to an aspect, the Receive scheduling and parameters updates 622 process will update the Dimming and Testing Schedule DB 524 and may also refresh a sleep timer for the gateway 102 based on the dimming and testing schedule. When a scheduled test is triggered 604, the gateway 102 sets the dimming to the requested light percentage/lumen intensity 606, and at the monitoring sensor and driver event step 610, the sensor events database 612 is updated and the gateway 102 enters sleep mode 602 until the next scheduled dimming control or sensor reading action.

According to an aspect of an exemplary embodiment, a scheduled dimming control and/or sensor reading action includes at least one sensor reading that is completed by the system 100. The system 100 may send sensor measurement requests to the sensors directly or via the gateway 102. The requests can be, for example, to perform an action only when the temperature readings reach a specific level/range, the AMP reading reaches a specific range, and read color intensity of the light source multiple times.

With further reference to FIG. 4, when a sensor event occurs there can be multiple outcomes. In an embodiment, if the sensor reading is the last sensor reading required for a specific associated dimming level, the gateway 102 will decide whether the resulting measurements justify a new baseline message 614 or an updates message (FIG. 7). The gateway 102 may generate a new baseline message and send it to the cloud server (106) 616 if, for example, no baseline reading exists or the current baseline sensor readings are different from previous, corresponding baseline sensor readings by a set threshold. The gateway 102 may decide to generate and forward to the cloud server 106 an updates message if, for example, the current sensor readings indicate that aspects of the light intensity, color/color temperature, and/or environment have changed since the last sensor readings, as described further below with respect to FIG. 7. The gateway 102 may also update the dimming control and sensor reading schedule 616 in the Dimming & Testing Schedule DB 524 to set the next dimming control or sensor reading action before entering sleep mode 602. In an exemplary embodiment, the gateway 102 will enter sleep mode whenever it is waiting for a dimming control or sensor reading action, or other associated, scheduled task.

According to an aspect, before the gateway 102 enters sleep mode the current sensor readings and associated information, such as the time of the reading, are recorded in the Sensor Events DB 612 for future processing or reference. Further, in the exemplary embodiment shown in FIG. 6, the gateway 102 updates a Message Status DB 618 with information regarding any baseline or updates messages that were (or were not) generated and or sent to the cloud servers 106, including, for example, the differences between the current baseline sensor readings and previous baseline sensor readings compared to the threshold for a new baseline message. On the other hand, when a new baseline message is not required, the gateway 102 goes to step 620 for the updates message process described with respect to FIG. 7.

FIG. 7 illustrates an exemplary embodiment of a process 700 for Creating an 'Updates Message' 620. According to an aspect, the Creating an Updates Message 620 depends on the accumulation of all prior updates messages recorded in the Message Status Database 618. The gateway 102 can read the Message Status DB 618 to identify past baseline and updates messages 702 and read the Sensor Events Database 612 to identify previous sensor readings. The gateway 102 is further configured to receive the current dimming level of the luminaire 112 and current sensor readings from the sensor subsystem 108. Thus, the gateway 102 can identify sensor readings that have changed 704 from previous sensor readings and generate an updates message 706 to include those readings only and send this message to the cloud server 106. Once the updates message is sent, the Message Status DB 618 is updated for future analysis and the gateway 102 may enter sleep mode and wait for the next scheduled dimming control or sensor reading action in the Standard Operational Mode 530.

Figure 8:
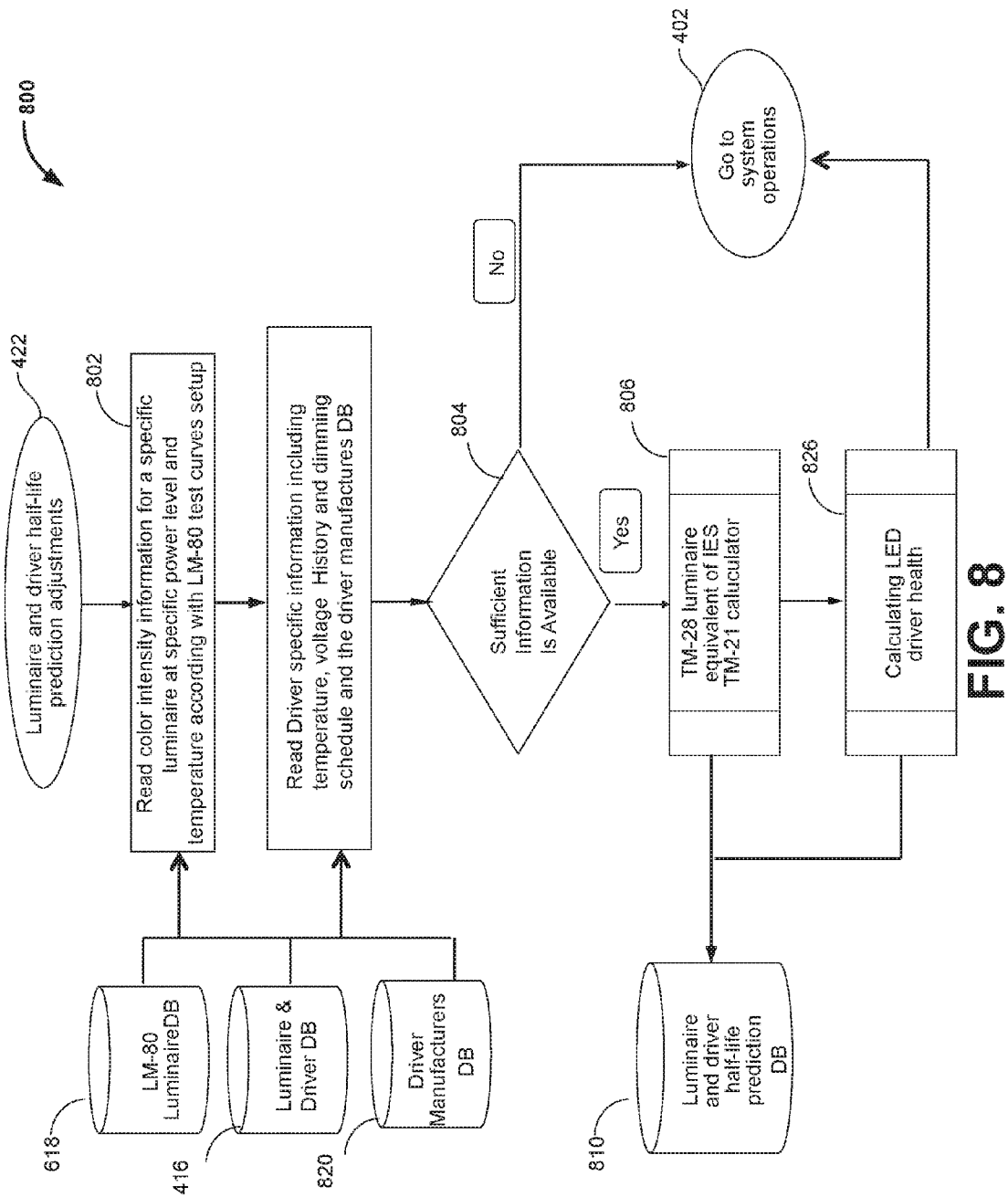
FIG. 8 illustrates a flow chart of a system including cloud servers calculating specific luminaire and driver end-of-life prediction information, according to an aspect.
Figure 8A:
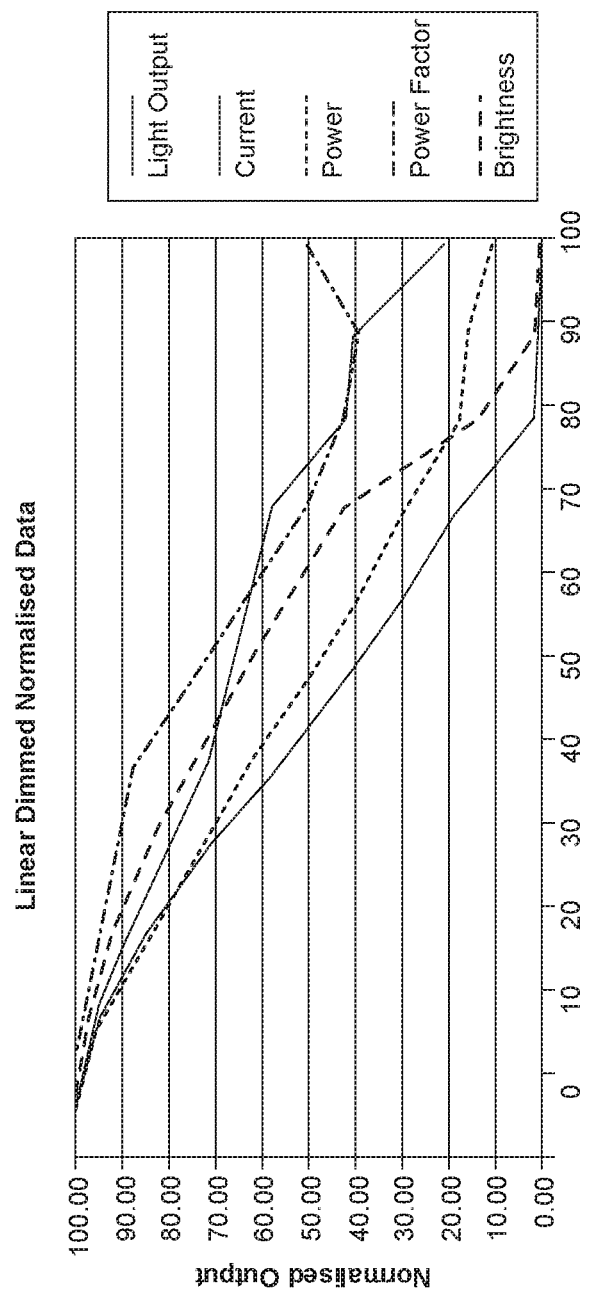
FIG. 8A illustrates a graph of normalized data regarding associated parameters of luminaire operation at different dimming levels.

FIG. 8 depicts an exemplary embodiment 800 of cloud servers calculating specific luminaire half-life prediction information, as follows. In order to calculate luminaire degradation, upward looking color sensors provide color intensity and/or luminosity readings/measurements that are linearly correlated to a luminaire light intensity depreciation graph (FIG. 8A). The linear correlations are normalized over time in this embodiment and the color sensors are consistent in their readings across a plurality of sensors such that when an LED light intensity reading is changing by X %, the sensor color intensity reading changes by the same X %. The sensor 'total intensity readings' may not be equivalent to the actual lumen emission by the luminaire device that the sensors are attached to due to any number of factors such as distance or orientation of the sensor to the light source, interference, etc. The disclosed systems and methods allow the color intensity of each luminaire to be accurately correlated at any given time, regardless of the type of luminaire, because the data is dynamic and normalized. The normalized, linear correlations also provide compensation for differences between different types of dimming controllers (drivers) and inherent variations in tolerances of the same dimming controllers.

When exponential graphs are linearly correlated, a change in one (the curve) can fit the curve (change) in the other directly. Illuminating Engineering Society of North America (IESNA) Standard LM-80 ("Approved Method for Measuring Lumen Maintenance of LED Light Sources") includes manufacturing data for a plurality of LED light sources, which when paired with a luminaire's chip running temperature can provide theoretical predictive life calculations. By testing the luminaire to IESNA LM-79 ("Approved method for the Electrical and Photometric Measurements of Solid-State Lighting Products") standards and utilizing any IESNA Standard LM-82 ("Characterization of LED Light Engines and LED Lamps for Electrical and Photometric Properties as a Function of Temperature") data that may be available, a Luminaire and Driver DB 416 may be generated. The Luminaire and Driver DB 416 includes information that is specific to the fitting and dimming, as well as to the sensor reading ranges, etc., associated with the specific luminaire. The Luminaire and Driver DB 416 also includes information such as past sensor readings, associated times of reading, dimming level, temperatures, current readings, etc. Sensor readings such as color intensity and temperature, among others, can be normalized based on the original (initial) readings received upon installation and/or commissioning of the luminaire in the lighting system as in FIG. 5.

In one embodiment, an Energy Star® TM-28 calculator, which is the equivalent of an Illuminating Engineering Society (IES) TM-21 ("Lumen degradation lifetime estimation method for LED light sources") calculator 806, is taking data that was collected over time in the Luminaire & Driver DB 416 for test samples and is plotting this information after normalization into TM-28. This step allows for prediction of luminaire maintenance over time. The standard information within LM-80 given by the manufacturer may be insufficient and is dependent on a fixed temperature and the current state of the luminaire for the readings. In one embodiment, the disclosed system is using the sensor readings at specific temperatures and dimming levels to extrapolate the place of the luminaire color intensity readings on the LM-80 given curves of this specific luminaire. Using this information, and knowing the time period elapsed between readings, and after correlating this information with previous readings, the system can extrapolate a new curve that more accurately represents the current luminaire's behavior. As such, the relationship or correlation between color temperature and dimming level can be determined, and this relationship can be updated over time as the color temperature (lumen level) of the luminaire degrades over time. This new curve is based on the luminaire's true environment and usage (e.g., dimming schedule, power and temperature levels, degradation of the lens and the physical fittings, etc.) over time. This information is stored in the Luminaire & Driver Half-life Prediction DB 810 for future use, and the next step is to wait for the next event as part of the System Operations 402.

The multiple sensor readings associated with color intensity are normalized using an equation that divides the current reading by the initial reading taken when the luminaire was first installed and/or commissioned in the lighting system as in FIG. 5.

According to an aspect, the luminaire 112 and dimming control 110 half-life adjustments/end of life predictions begins at step 802, where the cloud servers 106 read the color intensity information for a specific luminaire at a specific power level and temperature. In an embodiment, step 802 occurs after the cloud servers 106 have received information from the LM-80 Luminaire DB 812 and the Luminaire and Driver DB 416. The Luminaire and Driver DB 416 may include information specific to the fitting and dimming, as well as to the sensor reading expected ranges, associated with the specific luminaire 112. According to an aspect, the Luminaire and Driver DB 416 may also include all past sensor readings, with the associated times/time stamps of when the reading, dimming levels, temperatures and current readings took place (see, for instance, FIGS. 4-7). In an embodiment, the sensor, temperature, and current readings can be normalized based on the original readings received upon installation of the luminaire 112, as shown in the setup and discovery operations in FIG. 5.

At step 803, the cloud servers 106 may read information received from Driver Manufacturers DB 820 and the Luminaire and Driver DB 416 for the specific luminaire 112. The information may include the specific power levels and temperatures, as well as the sequence of temperature changes of the electronic dimming control 110. According to an aspect, the Luminaire and Driver DB 416 includes information that is specific to the fitting, the dimming control 110 and the dimming level, as well information that is specific to the expected ranges of the sensor readings of the specific luminaire 112. As described in further detail hereinabove, the Luminaire and Driver DB 416 may also include all past readings with associated time stamps, and may normalize the readings based on the original readings received upon installation of the luminaire 112. At step 804, the cloud servers 106 may decide if the collected and/or accumulated information/readings are sufficient to continue with calculations. If the response is 'No', then the operation moves to step 402, which is the system operation's main loop where the cloud server will wait for sufficient readings to be collected. If the response is 'Yes', then the operation moves to step 806.

At step 806, the TM-28 luminaire equivalent of the IES TM-21 calculator takes data that was collected over time in the Luminaire and Driver DB 416 to create a test sample. The data for the test sample may be plotted in a graphical format, after normalization the data into the TM-28 luminaire. According to an aspect, this step allows for the prediction of lumen maintenance over time, which helps to predict potential failure of the luminaire 112. At step 826, end of life prediction may be updated using new information collected about the dimming control (driver) 110, the temperature, and the ON/OFF cycles for the luminaire (based on current levels, as accumulated and reported). At step 810, the information generated in step 806 and step 826 is stored in the Luminaire & Driver Half-Life Prediction DB for future use, thus the system 100 may retain the information and use the information to create further end-of-life predictions based on failure variable indications of the dimming control 110 and, optionally of the luminaire 112.

Figure 9:
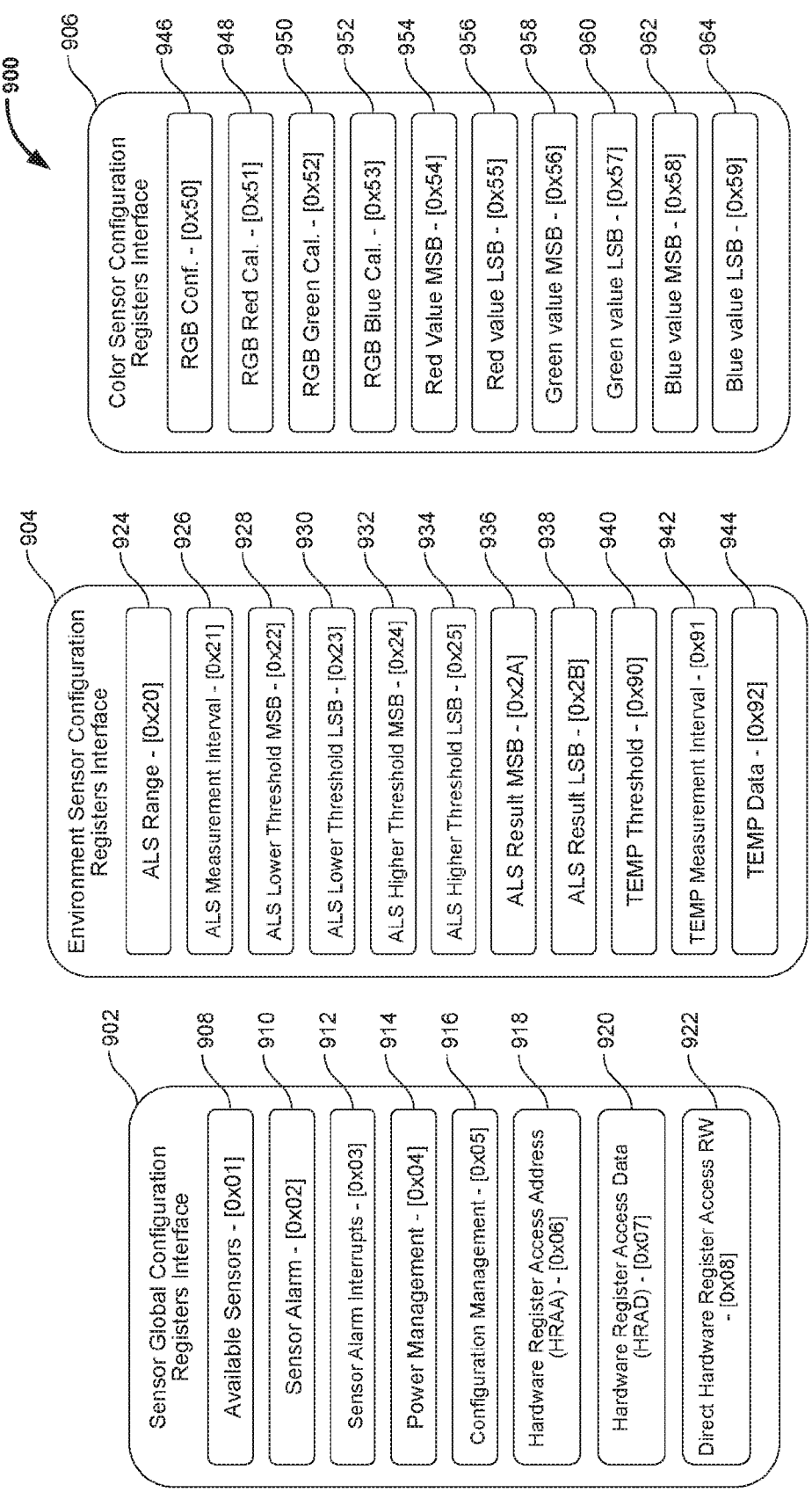
FIG. 9 illustrates a diagram of sensor interface data structures of a system, according to an aspect.

FIG. 9 illustrates an embodiment 900 of the sensor interface data structures. According to an aspect, the sensor interfaces include a Sensor Global Configuration Registers Interface 902, an Environment Sensor Configuration Registers Interface 904, and a Color Sensor Configuration Registers Interface 906. In an embodiment, each data structure sends information and/or receives information through a device register. In an embodiment, each data structure is a memory mapped register. To send information via a memory-mapped register, an application writes to a memory address allocated for the register. To receive the information, the application reads the memory address that was allocated for the specific register. In FIG. 9, the relative address of the register is identified by/marked in boxed brackets '[ ]'. The size of every address is exactly one byte (eight bits).

According to an aspect, the Sensor Global Configuration Registers Interface 902 includes a plurality of global configuration registers, which are responsible for performing a plurality of activities. Available Sensors—[0x01] 908 shows which sensors are available for the particular device/luminaire 112. In an embodiment, the Available Sensors—[0x01] 908 may show at least a Temperature Sensor (TEMP), an Ambient Light Sensor (ALS), a color sensor (RGB), a Motion detector sensor based on passive infrared (PIR), a Motion detector and a direction sensor based on frame capture. Other available sensors may also be shown in the Available Sensors—[0x01] 908. A Sensor Alarm—[0x02] 910 may show which sensors have generated an interrupt. A Sensor Alarm Interrupts—[0x03] 912 may enable/disable the interrupts from each available sensor whenever an alarm signifying/providing notice of the interrupt is generated. Power Management—[0x04] 914 may control power up and/or power down functions for each of the different sensors. Configure Management—[0x05] 916 may store register values in non-volatile memory. Hardware Register Access Address (HRAA)—[0x06] 918 may hold the address for accessing the internal hardware registers of the sensors. Hardware Register Access Data (HRAD)—[0x07] 920 may hold the data to load/store in the address given in a register, such as, for example the register HRAA—[0x06] 918. The Sensor Global Configuration Registers Interface 902 may further include a Direct Hardware Register Access RW—[0x08] 922. According to an aspect, if the Direct Hardware Register Access RW—[0x08] 922 holds a value "1", then the data in the register HRAD—[0x07] 920 is written to the address in register HRAA—[0x06] 918. If, however, the Direct Hardware Register Access RW—[0x08] 922 holds a value "0", then the data pointed to/identified by the register HRAA—[0x06] 918 can be read in the register HRAD—[0x07] 920.

In an embodiment, the Environment Sensor Configuration Registers Interface 904 includes a plurality of environment specific sensor registers. The environment specific sensors may include an Ambient Light Sensor (ALS) Range—[0x20] 924. According to an aspect, if the ALS Range—[0x20] 924 holds a value "1" it enables a high measurement range of 1000-10,000 Lux for the ALS. If, however, the ALS Range—[0x20] 924 holds a value "0", then a low measurement range of 1-1,500 Lux is enabled. The Interface 904 may include an ALS Measurement Interval—[0x21] 926, which displays the elapsed time between subsequent ALS measurements. The subsequent ALS measurements may include an ALS Lower Threshold Most Significant Byte (MSB)—[0x22] 928, and ALS Lower Threshold Least Significant Byte (LSB)—[0x23] 930, and ALS Higher Threshold MSB—[0x24] 932, and an ALS Higher Threshold LSB [0x25] 934. The ALS Lower Threshold MSB—[0x22] 928 displays Most Significant Byte (MSB) for ALS lower threshold for triggering an alarm. The ALS Lower Threshold LSB—[0x23] 930 displays List Significant Byte (LSB) for ALS lower threshold for triggering an alarm. The ALS Higher Threshold MSB—[0x24] 932 displays MSB for ALS higher threshold for triggering an alarm. The ALS Higher Threshold LSB—[0x25] 934 displays LSB for ALS higher threshold to trigger an alarm. The Interface 904 may include an ALS Result MSB—[0x2A] 936, an ALS Result LSB—[0x2B] 938, a TEMP Threshold—[0x90] 940, and a TEMP Measurement Interval—[0x91] 942. The ALS Result MSB—[0x2A] 936 displays MSB for ALS measurement results. The ALS Result LSB—[0x2B] 938 displays LSB for ALS measurement results. The TEMP Threshold—[0x90] 940 displays upper threshold value for when an interrupt is triggered. The TEMP Measurement Interval—[0x91] 942 displays a temperature measurement interval in seconds. A TEMP Data—[0x92] 944 may also be included in the Interface 904, and may display temperature values in degrees Celsius. The Color Sensor Configuration Registers Interface 906 may include a plurality of color specific sensors. In one embodiment, the colors are Red, Green and Blue (RGB). The plurality of color specific sensors may include an RGB Conf.—[0x50] 946 to control both a calibration configuration and report when a sensor reading is available. An RGB Red Cal.—[0x51] 948 may display a calibration constant for a red value from an RGB sensor. A RGB Green Cal.—[0x52] 950 may display a calibration constant for a green value from the RGB sensor. A RGB Blue Cal.—[0x53] 952 may display a calibration constant for a blue value from the RGB sensor. According to an aspect, a Red Value MSB—[0x54] 954 displays MSB result of the red value from the RGB sensor, and a Red Value LSB—[0x55] 956 displays LSB result of the red value from the RGB sensor. A Green Value MSB—[0x56] 958 may display MSB result of a green value from the RGB sensor, and a Green Value LSB—[0x57] 960 may display LSB result of a green value from the RGB sensor. A Blue Value MSB—[0x58] 962 displays MSB result of a blue value from the RGB sensor, and a Blue Value LSB—[0x59] 964 displays LSB result of a blue value from the RGB sensor. Other colors or any other plurality of colors can be used for color intensity measurements. The sensor chosen may depend, at least in part, on the LED/luminaire color utilization. Since luminaires 112 may include design-based or physics-based preferences to emit specific colors, the color sensor used in specific cases should be based on those colors. It is envisioned that while RGB sensors are provided herein, other colors and/or color specific sensors may be utilized.

Figure 10:
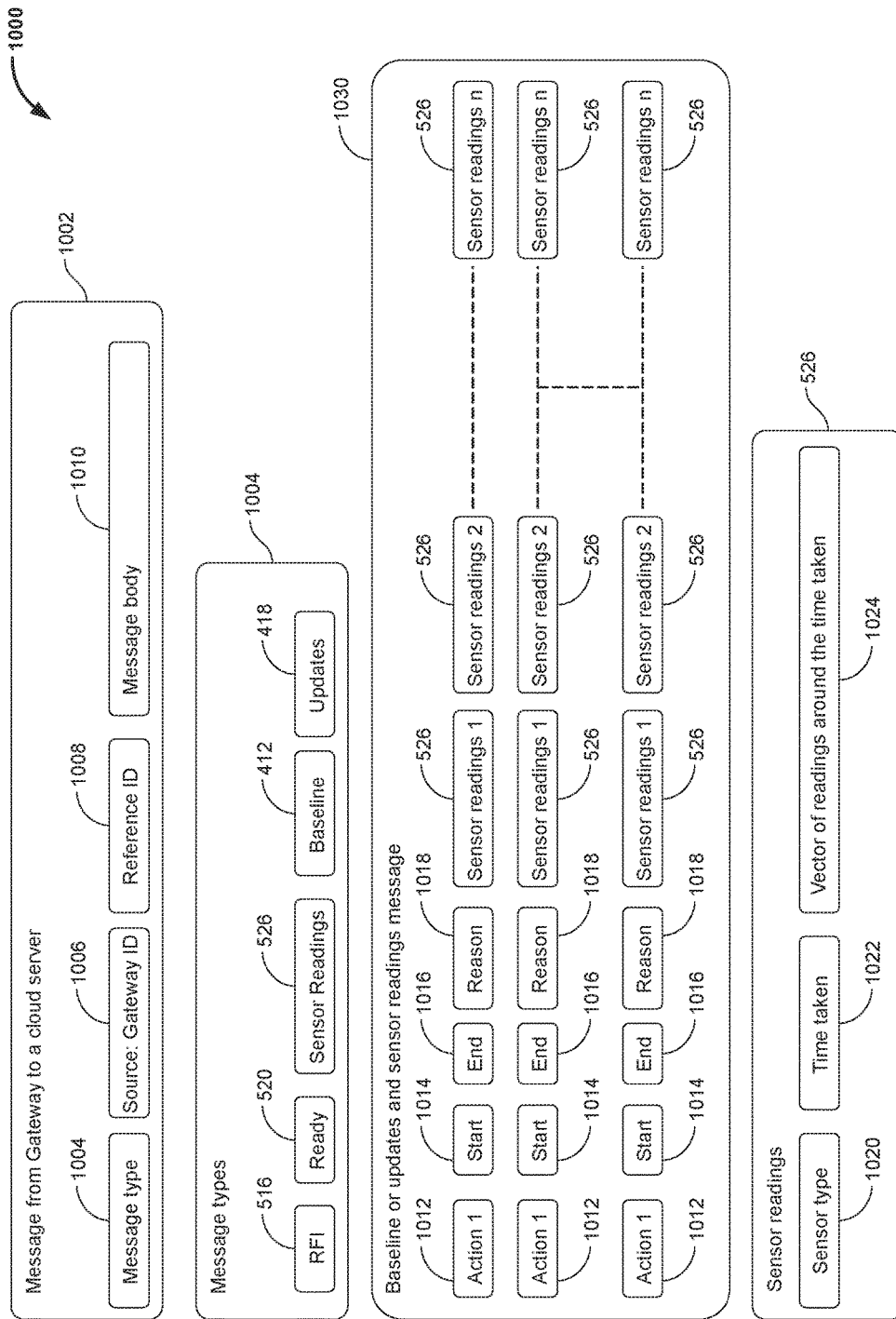
FIG. 10 illustrates a diagram of a message structure for messages delivered in a system from a gateway to cloud servers, according to an aspect.

FIG. 10 illustrates an exemplary embodiment 1000 of a message structure for messages delivered from the gateway 102 to the cloud servers 106. In an embodiment, the message 1002 from the gateway 102 to the cloud server 106 is a single structure message. The single structure message may include a Message type 1004, a sender gateway unique identification (ID) ("Source: gateway ID") 1006, a unique Reference ID 1008 and a Message body 1010. The Message type 1004 may inform the receiver about the type of the message being delivered. As used herein, the reference ID 1008 is an internal number that may be used when there is a conversation/message communication between the cloud servers 106 and the gateway 102. In an embodiment, the message body 1010 can be a baseline message or an updates message and it is structured the same in both cases.

In an embodiment, the Message types 1004 includes a 'Request for Information' (RFI) 516, which is sent upon initialization of the luminaire, and a 'Ready' message 520 that is sent during initializations of the luminaire 112, after discovering the dimming protocol and when the gateway 102 is ready for further instructions. The Message types 1004 may include a Sensor readings message 526, which is sent to the cloud servers 106 during the initialization period. Additional Message types 1004 include the 'Baseline' message 412 and the 'Updates' message 418, which are used when sending baseline and updates messages, respectively, which are based on prior sensor readings taken and/or transmitted by the gateway 102.

In an embodiment, the Baseline 412 or the Updates message 418 and the Sensor Readings message 526 is a 'Message body' 1030. The message structure of the Message body 1030 may be the same as the structures of the baseline 412 or updates 418 messages, and the sensor readings 526. For every 'action' 1012 included in the Message body 1030, such as, for example, a dimming level set, there is a 'Start' 1014 (an actual start time) and, an 'End' 1016 (an actual termination/end time), and a 'Reason' 1018 (why the action was terminated), and a plurality of sensor readings 526 for all sensors participating in the action 1012. According to an aspect, the sensor readings may have been previously scheduled by the cloud server 106. One exemplary 'Reason' 1018 that an action may be terminated is a failure to obtain an accurate feedback dimming level.

The Sensor reading 526 part of the message may include a 'Sensor type' 1020 field to indicate which sensor reading is being communicated (such as, for example, TEMP, ALS, and RGB), a 'Time taken' 1022 field to indicate when the sensor reading was taken, and a 'Vector of readings around the time taken' 1024, which includes multiple readings centered around the 'Time taken' 1022 field. In an embodiment, the number of readings can be based on the sensor type. According to an aspect, the number of readings taken is three, including shortly before, at, and shortly after the 'Time taken' 1022 field value.

Figure 11:
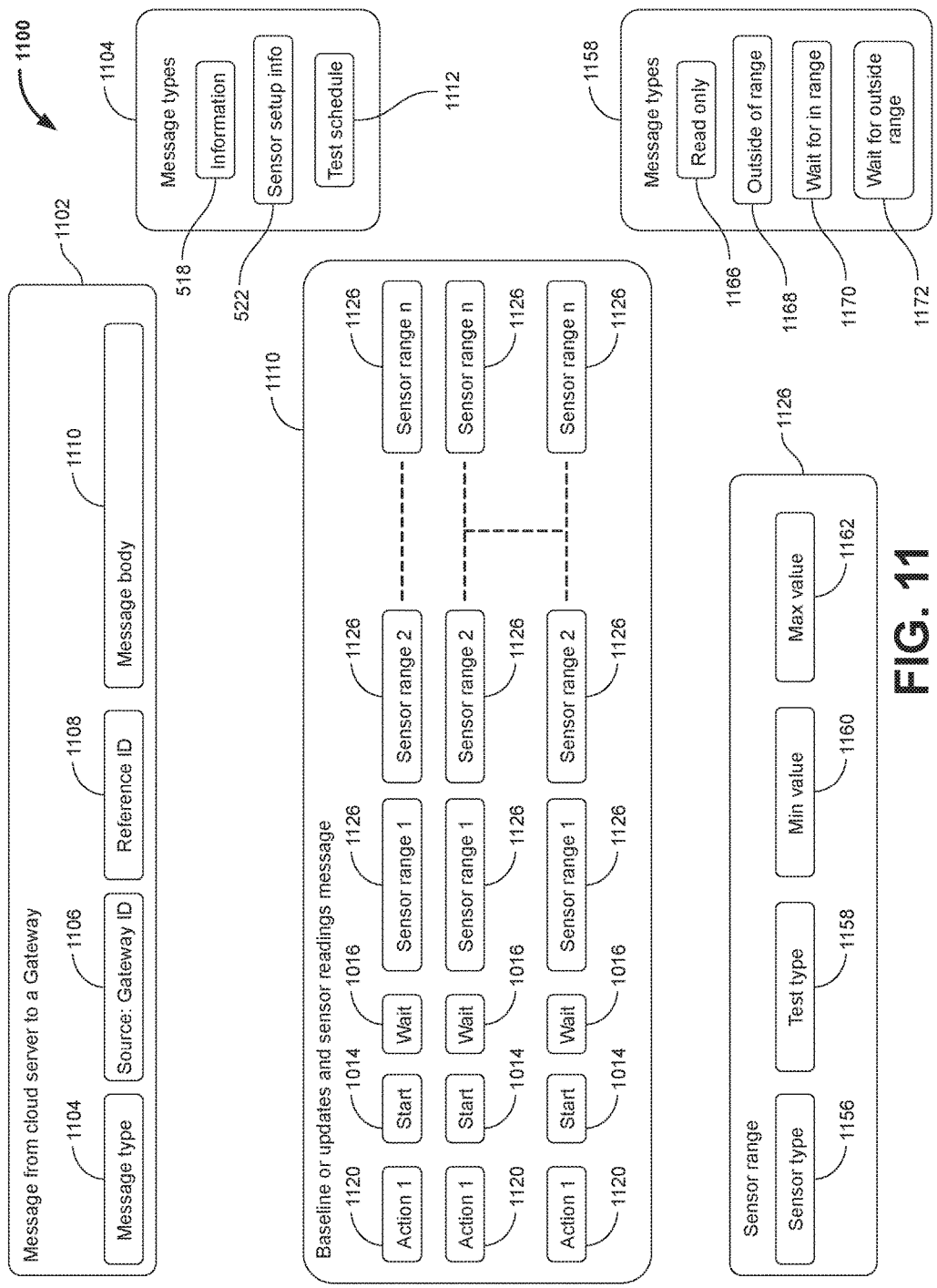
FIG. 11 illustrates a diagram of a message structure for messages delivered in a system from cloud servers to a gateway, according to an aspect.

FIG. 11 depicts an exemplary embodiment 1100 of the message structure for messages delivered from the cloud servers 106 to the gateway 102. The messages may be delivered by a UART 224 power meter interface including a transmitter and a receiver. In an embodiment, the structure of the message 1102 is constant. The constant message structure may include a Message type 1104, a target gateway unique ID 1106, a unique Reference ID 1108 and a Message body 1110. The Message type 1104 may identify the type of message being transmitted/received and let the receiver know what kind of message it is. The unique reference ID 1108 is an internal number that maybe used when there is a conversation between the cloud servers 106 and the gateway 102. In an embodiment, the Message body 1110 is a Sensor Future Reading Schedule 528.

In the exemplary embodiment shown in FIG. 11, the Message types 1104 may include the 'Information' 518, the 'Sensor Setup Info' 522 and a 'Test Schedule' 1112. The 'Information' 518 may include the 'Sensor Setup Info' 522 messages, which provides the gateway 102 with information about valid ranges for sensor readings at different dimming levels. According to an aspect, the Message body 1110 is a Sensor Future Reading Schedule 528. The Sensor Future Reading Schedule 528 may provide/serve as a baseline for the gateway 102 in its internal measurement and initialization cycle. In an embodiment, the gateway 102 includes a default setup, which may be updated by the Sensor Future Reading Schedule 528. The Sensor Future Reading Schedule 528 may include an 'Action' 1120 field, which may include the dimming level, a 'Start' 1122 field (the start time for the test), a 'Wait' 1124 field (the duration to wait before any measurement commences), followed by a list of sensors that are configured to participate in the measurements. In an embodiment, the list of sensors, 'Sensor range n' 1126, is given as a list of Sensor ranges per sensor 1126.

In an embodiment, the Sensor range 1126 includes a 'Sensor Type' 1156 field, which identifies the sensor, and a 'Test Type' 1158 field, which informs/instructs the gateway 102 how to run the test. The Sensor range 1126 may further include a 'Min Value' 1160 field and a 'Max Value' 1162 field, each of which may provide the valid range for the sensor in this test. In an embodiment, the 'Test Type' 1158 directs/instructs the gateway 102 to handle different sensor values utilizing different methods/ways. These methods may include a 'Read Only' test 1166, an 'Outside of Range' test 1168, a 'Wait For in Range' test 1170, and a 'Wait for Outside Range' test 1172. In an embodiment, when the Test Type 1158 is the 'Read Only' test 1166, the value of the sensor is retrieved regardless of the sensor reading range. When the Test Type 1158 is the 'Outside of Range' test 1168, the value of the sensor is outside of the sensor reading range to be retrieved. When the Test Type 1158 is the 'Wait for in range' test 1170, the gateway 102 does not continue with other sensor readings/measurements until the specific sensor is in a desired/given range. In an embodiment, when the Test Type 1158 is the 'Wait for outside range' test 1172, the gateway 102 does not continue to read sensor values until the sensor value is outside the given range.

Figure 12:
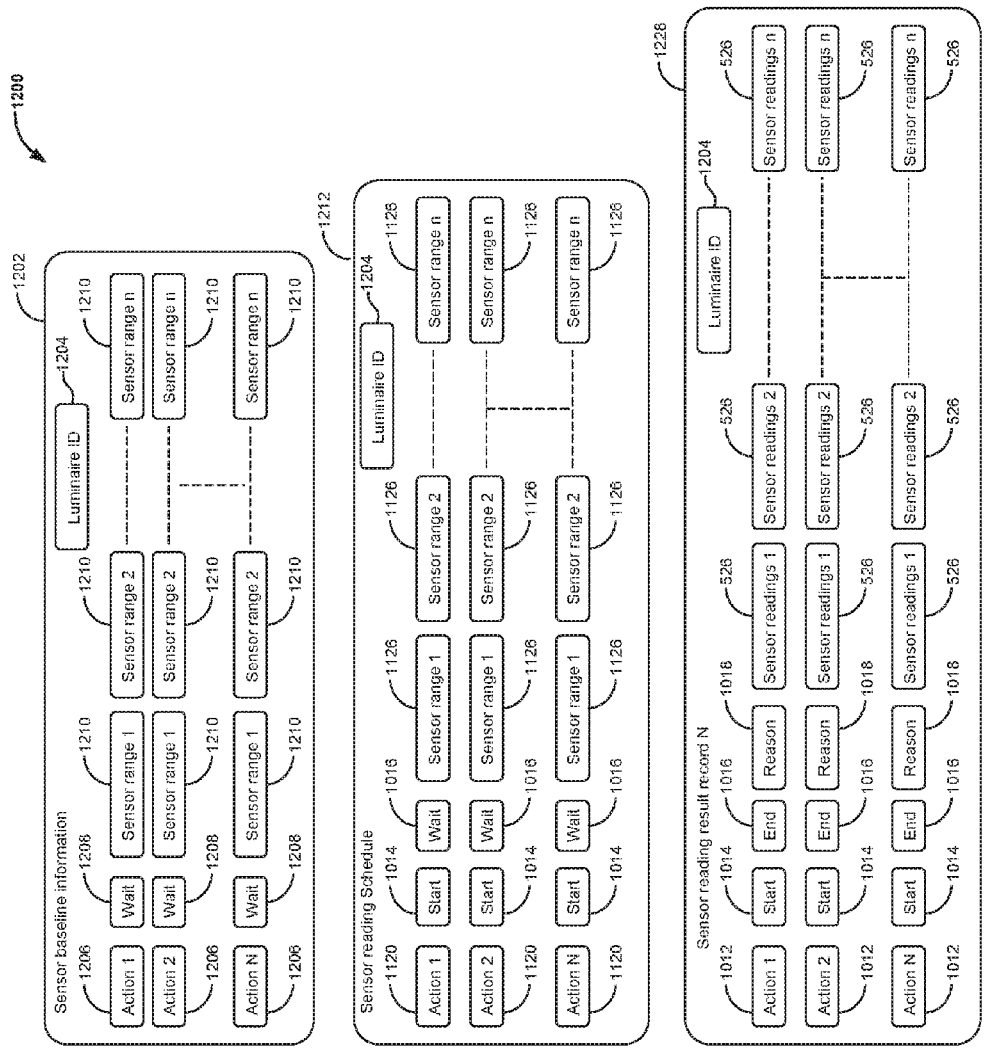
FIG. 12 illustrates a diagram of a luminaire database structure, according to an aspect.

FIG. 12 illustrates an exemplary embodiment 1200 of the Luminaire Database structure. The Luminaire Database may include three types of records for every connected luminaire 112 in the system 100. In an embodiment, the records include a Sensor Baseline Information 1202, a Sensor Reading Schedule 1212 and a Sensor Reading Result Record 1228. In an embodiment, each luminaire 112 includes a single Sensor Baseline Information 1202 and a single Sensor Reading Schedule 1212 record. The Sensor Reading Result Record 1228 is illustrated in FIG. 12 by number ranges between 1 and N. This type of record may be added for each reading result, and may be kept/stored for as long as is needed, e.g., N can be very large.

In an embodiment, the Sensor Baseline Information 1202 includes sensor range information for all possible dimming levels that might be tested for the luminaire 112. The sensor range information may include a dimming action 1206, a minimal wait time 1208, and a list of sensor ranges. Each dimming action field 1206 may include the minimal Wait time 1208, which directs the gateway 102 to wait before taking sensor measurements, and a list of Sensor range fields 1210. According to an aspect, each sensor that needs to be monitored includes one list of Sensor range fields 1210. The Sensor Baseline Information 1202 includes a Luminaire ID 1204 field, which identifies the luminaire 112 that the record belongs to.

According to an aspect, the Sensor Reading Schedule 1212 record is identical to the Sensor Future Reading Schedule 528, as described above with reference to FIG. 11. The Sensor Reading Schedule 1212 may include one additional field, namely, the Luminaire ID 1204 field, which may be used to identify the luminaire 112 to which the record corresponds. In an embodiment, the Sensor Reading Result Record 1228 is an accumulation of the Sensor Reading Message 1030 (see, for example, FIG. 10), except for one additional field—the Luminaire ID 1204 field. According to an aspect, each time the cloud server 106 receives a Sensor Reading Message 1030 that may be a Baseline message 412 or an Updates message 418, the cloud server 106 will store the message 412, 418 as a Sensor Reading Result Record 1228 for the specific luminaire 112.

Figure 13:
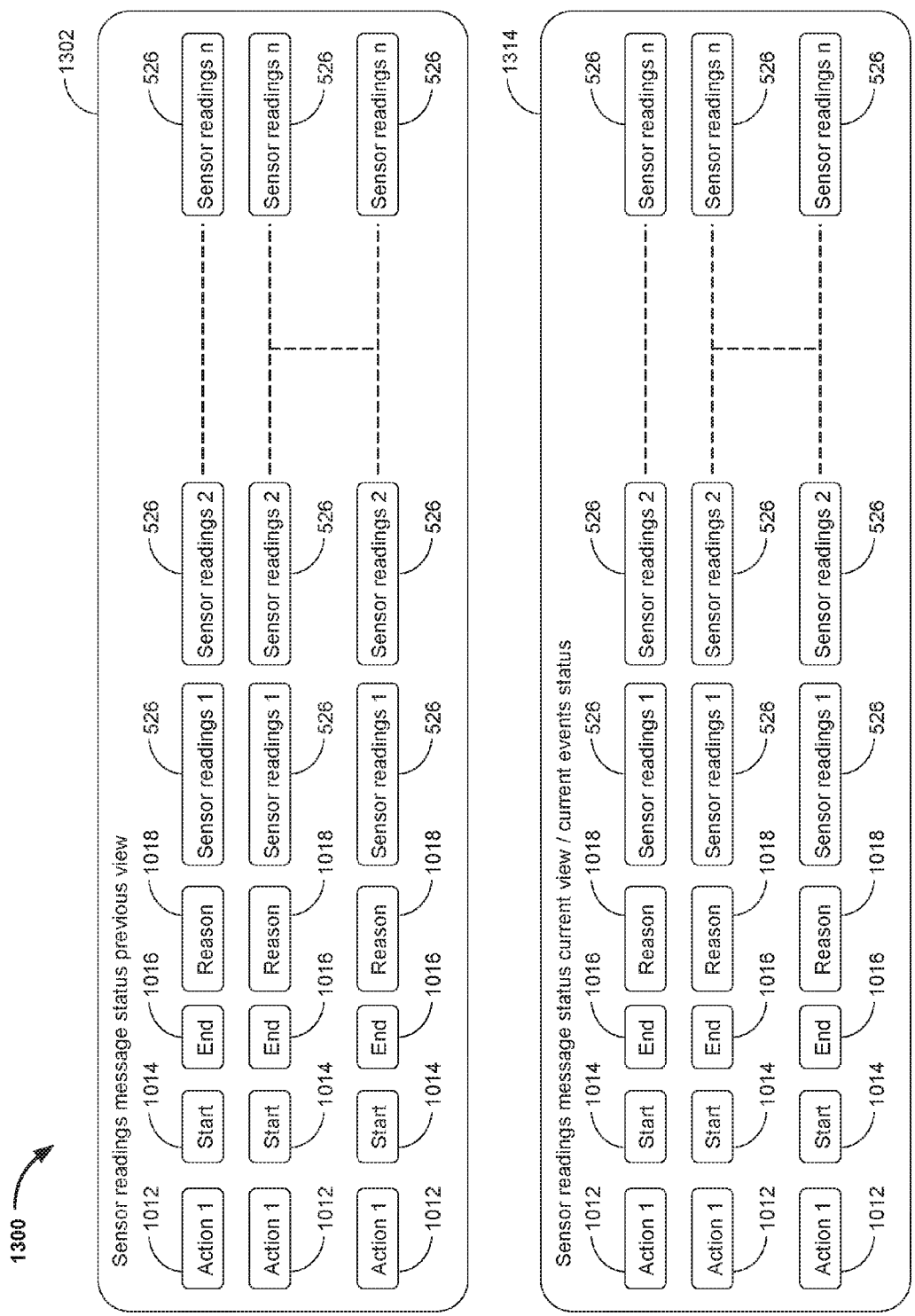
FIG. 13 illustrates a diagram of an events database and message status database structure of a system, according to an aspect.

FIG. 13 illustrates an exemplary embodiment 1300 of the Sensor Events DB 612 and the Message Status DB 618 structures. In an embodiment and as described above with respect to FIG. 6, the Sensor Events DB 612 may be the same as the Message Status DB 618. According to an aspect, the Message Status DB 618 is an accumulation of all sensor events associated with the reporting of scheduled test results. The Sensor Events DB 612 may additionally be used to record events in real-time, such that the information is recorded into the appropriate structures for future messages to be generated. In an embodiment, the Message Status Database 618 contains two records. The first record is a Sensor Readings Message Status Previous View 1302, and the second record is the Sensor Readings Message Status Current View/Current Events Status 1314. When reading events are triggered, the appropriate fields in the Readings Message Status Current View/Current Events Status 1314 record are updated. The updates may occur in real time, that is, at the same time the reading events are triggered. When an Updates message is being sent or before a Baseline message is being sent, the content of the Sensor Readings Message Status Current View/Current Events Status 1314 is copied into the Sensor Readings Message Status Previous View 1302. When a Baseline message is being sent, the entire Sensor Readings Message Status Previous View 1302 record (FIG. 10) may be sent as is.

Figure 14:
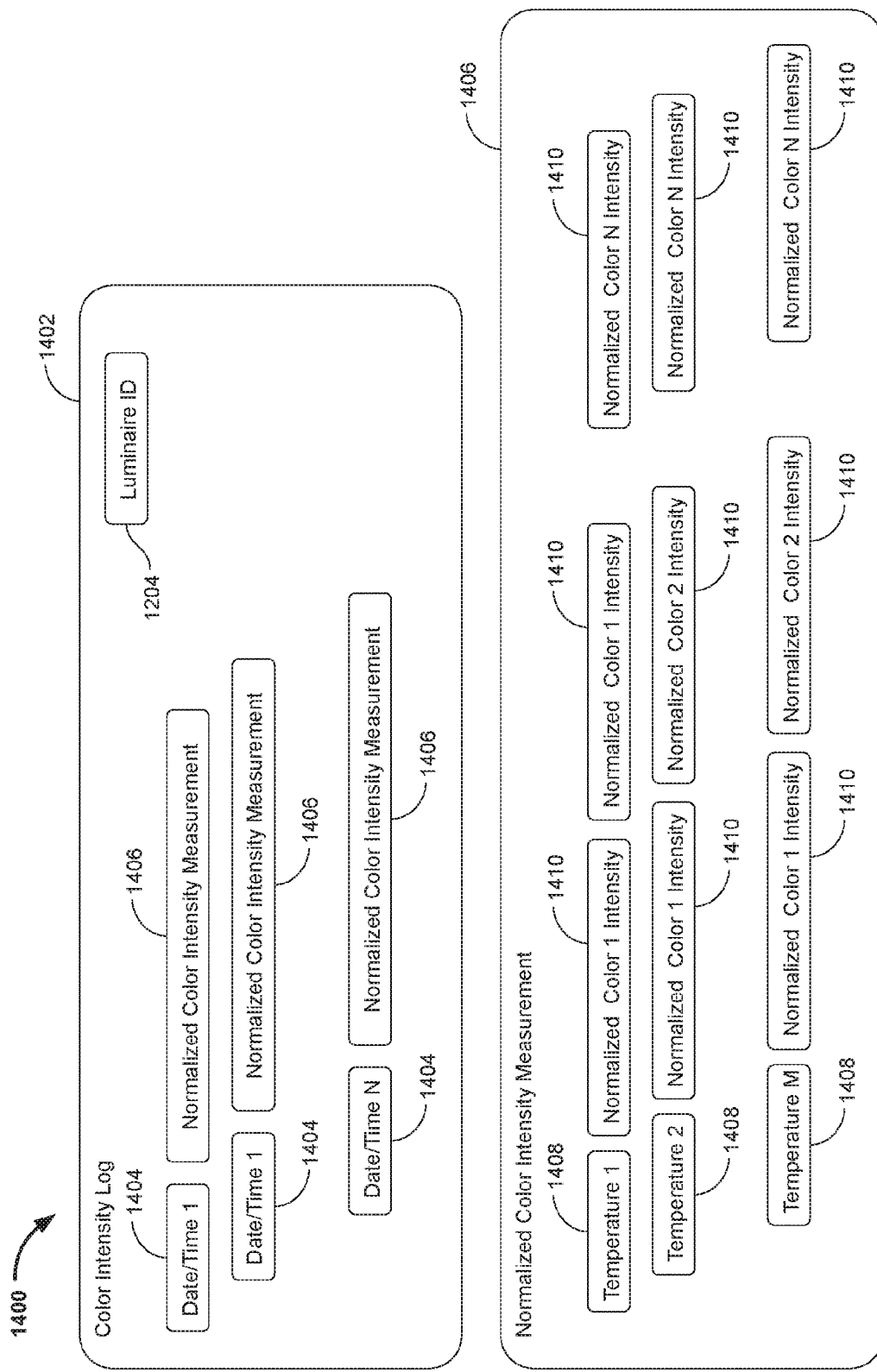
FIG. 14 illustrates a diagram of a luminaire and driver end-of-life prediction database structure, according to an aspect.

FIG. 14 illustrates an exemplary embodiment 1400 of the Luminaire & Driver Half-Life Prediction DB 810 structure. The database structure may include a Color Intensity Log 1402 and a Normalized Color Intensity Measurement 1406. According to an aspect, the database is a log for all the Normalized Color Intensity Measurements 1406 per luminaire 112 in the system 100. In an embodiment, each luminaire 112 may include the Color Intensity Log 1402 record, which includes the Luminaire ID 1204 field. The Luminaire ID 1204 field may identify the unique/specific luminaire 112 that the record belongs to. According to an aspect, the Color Intensity Log 1402 record is composed of N Normalized Color Intensity Measurement 1406 records. The Measurement 1406 record may include one record 1406 per each Date and/or Time 1404 when the measurement was received. In an embodiment, the Normalized Color Intensity Measurement 1406 record may include a list of Temperature fields associated with each measurement 1406. For each color being measured in the system 100, the Temperature fields may include the temperature at which the measurement was taken, and a list of normalized color intensity measurements 1422.

Figure 15:
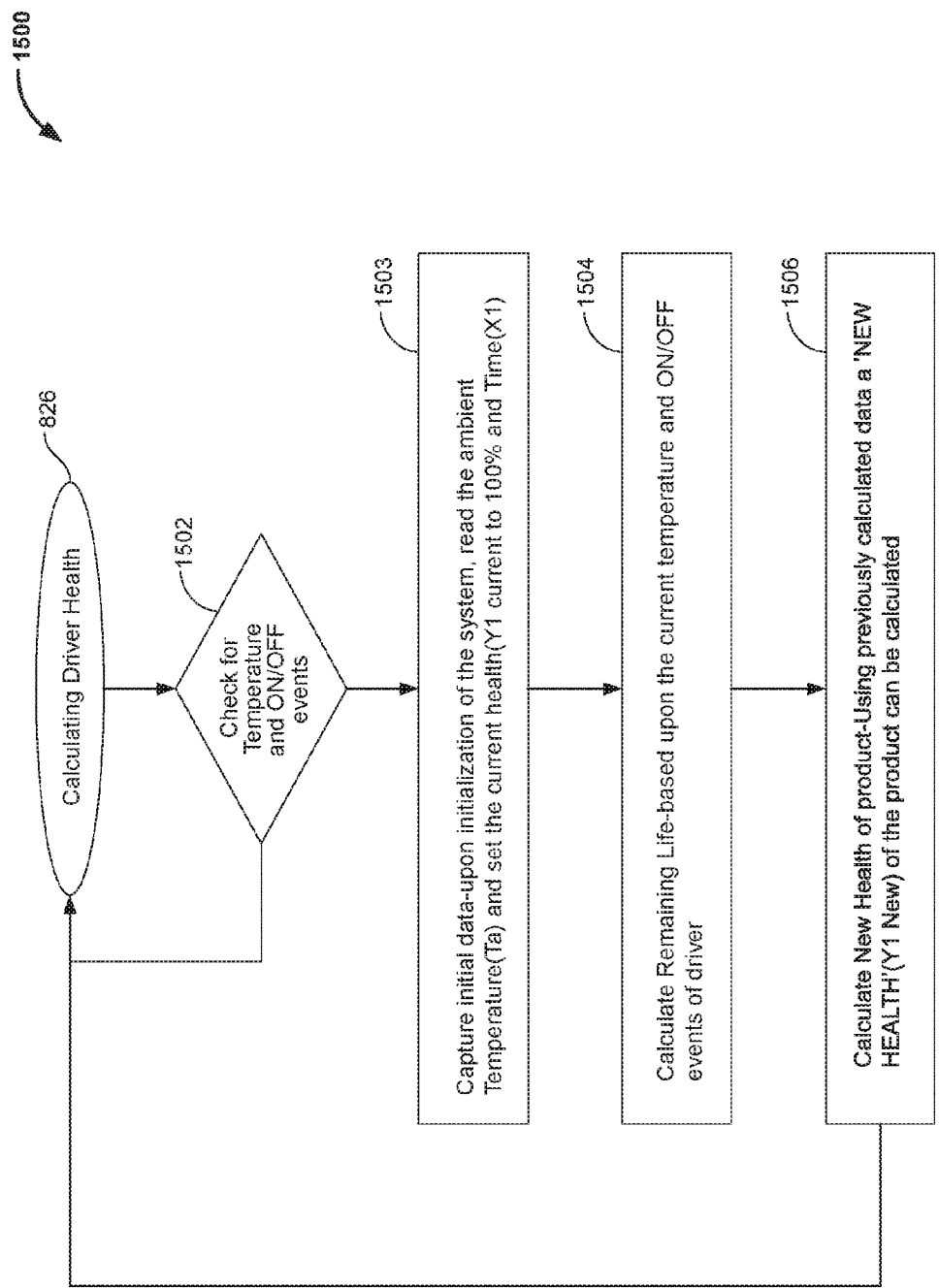
FIG. 15 illustrates a diagram of a system handling temperature change events, according to an aspect.

FIG. 15 illustrates an embodiment 1500 of the system 100 calculating driver health based on temperature. For the driver health calculations, ON/OFF cycle data for the luminaire 112 may be used to directly calculate the lifetime of any dimming control (driver) 110, based on a complete failure or end-of-life data provided in a manufacturer's datasheet. The calculation may be performed using a direct ratio of a number of the ON/OFF cycles as compared to the maximum supported ON/OFF cycles provided in the manufacturer's datasheet for the specific luminaire/device 112.

According to an aspect, at step 1502, the system 100 monitors/checks for the temperature of the dimming control 110. During step 1502, the system 100 may also check for the ON/OFF cycles. (See, for instance, FIG. 16). At step 1503, the system 100 captures initial data. According to an aspect, once the system 100 is initialized, the system 100 reads the Ambient Temperature (Ta) and sets the Current Health (Y1 Current) to 100% and Time (X1). In an embodiment, this information exists in the database and is known by the cloud server 106.

At step 1504, the system 100 calculates the remaining life of the dimming control 110 based on temperature and the number of ON/OFF cycles. The remaining life of the driver may be calculated based on the temperature as follows (See FIG. 16 for manufacturer's data):

$$L = L_o \times 2^{\frac{Tmax - Ta}{10}} \quad \text{(Eq. 1)}$$

where $L_o$ is the rated lifetime of capacitor, Tmax is the Maximum rated temperature of capacitor, and Ta is the ambient temperature.

In Equation 2, Tmax should be replaced with the manufacturer maximum case temp (Tc) rating supplied by the manufacturer. $L_o$ can be found in the specification sheet of the output capacitor provided by the manufacturer.

$$X_2 = \frac{0 - Y_{1 Current}}{\left(\frac{(0 - 100)}{L - 0}\right)} + X_1 \quad \text{(Eq. 2)}$$

where $X_1$ is the time of reading (in hours), $Y_{1\ Current}$ is the Health of Driver (%), and L is $$L = L_o \times 2^{\frac{Tmax - Ta\ Current}{10}}$$

where $L_o$ is the rated lifetime of capacitor (hours), $T_{max}$ is the Maximum driver Temperature Rating (° C.), and $T_{a\ Current}$ is the Measured Current Ambient Temperature (° C.).

At step 1508, the system 100 calculates the new health of the dimming control 110. The new health, illustrated as a 'New Health' (Y1 New), may be calculated using the previously calculated data:

$$Y_{1\ New} = 0 - \left(\frac{0 - 100}{L - 0} \times (X_{2\ previous} - X_{1\ Current})\right) \quad \text{(Eq. 3)}$$

where $X_{1\ Current}$ is the current Time of reading (in hours), $X_{2\ Previous}$ is the previous driver prediction (hours), and L is:

$$L = L_o \times 2^{\frac{Tmax - Ta\ Previous}{10}}$$

where $L_o$ is the rated lifetime of capacitor (in hours), $T_{max}$ is the maximum driver Temperature Rating (° C.), and $T_{a\ Previous}$ is the Previous Ambient Temperature Measurement (° C.).

A user may define specific intervals to measure and record the luminaire/LED driver temperature. Results and accuracy will benefit from a timestamp taken at every ambient temperature change to which the luminaire driver is subjected. Taking ambient temperature measurements, and well as the other measurements described above with respect to, for example, FIGS. 4-15, may include taking timestamps of those measurements Applying the above equations will result in obtaining a value that correlates with the health of the product/luminaire that corrects itself for the ambient temperatures surrounding the luminaire driver. To finish the end of life prediction of the specific driver, the slope/rate of decay needs to be taken into consideration. Using the last 2000 hrs of data that is available, a trend can be obtained that can give the estimated hours that the LED driver is away from failure. The slope may be calculated using the Equation 4:

$$m = \frac{Y_{n-2000} - Y_n}{X_{n-2000} - X_n} \quad \text{(Eq. 4)}$$

where $X_n$ the hours at time n (hours), $X_{n-2000}$ is the Hours at time n−2000 (hours), $Y_{n-2000}$ is the Health at time n (%), and $Y_{n-2000}$ is the Health at time n−2000(%).

Equation 5 presents an End of Life Prediction equation, which may be used by the system 100:

$$X_2 = \frac{0 - Y_1}{m} + X_1 \quad \text{(Eq. 5)}$$

where $X_1$ is the Current run time hours (hours), and $Y_1$ is the Current health of the driver (%).

Figure 16:
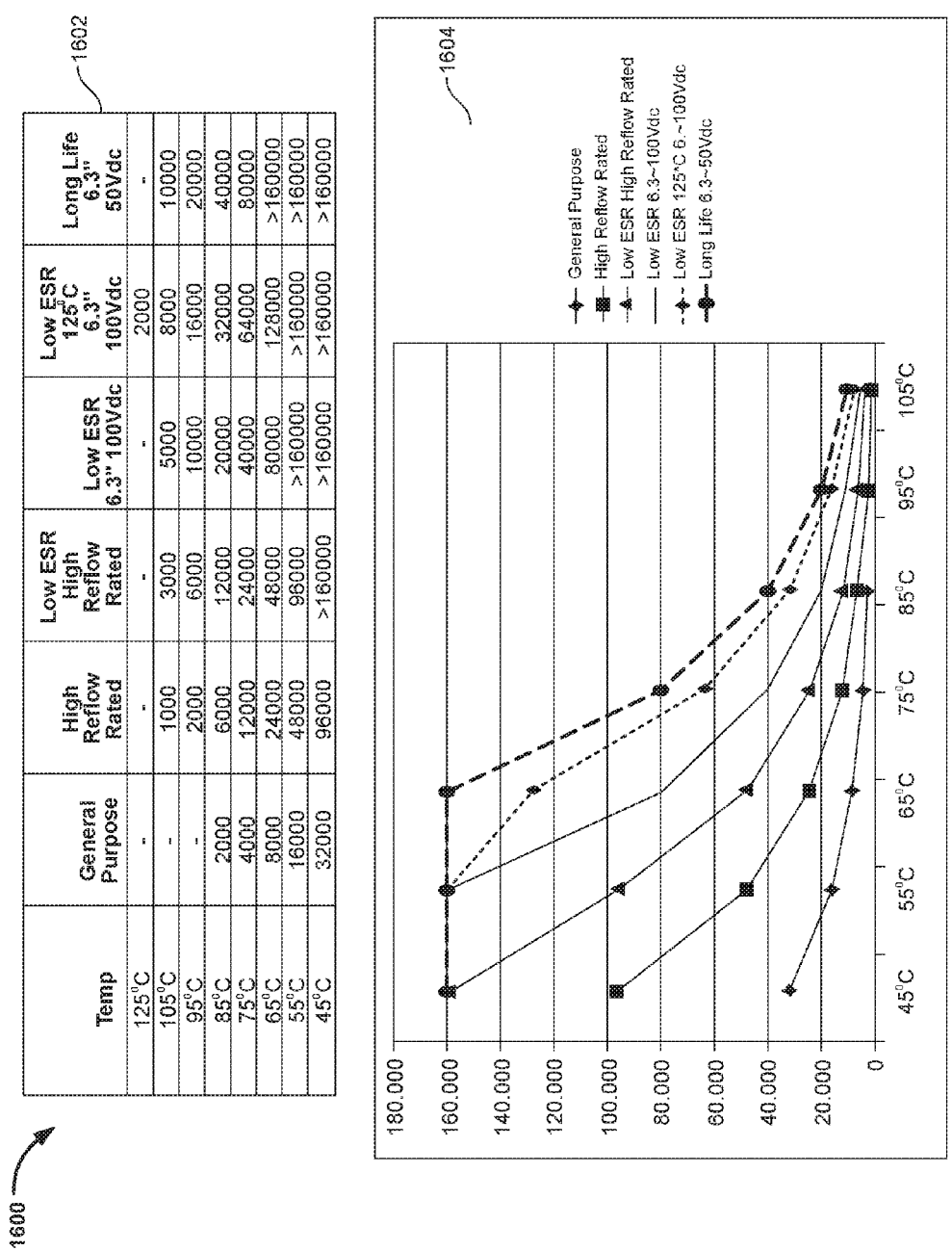
FIG. 16 illustrates a diagram of the effect of temperature on capacitor lifetime/life expectancy projections in hours, according to an aspect.

FIG. 16 illustrates an effect of temperature on capacitor lifetime projections, in hours. According to an aspect, the capacitor is positioned within/inside the dimming control 110. Temperature measurements taken of the dimming control 110 may be the temperature of the capacitor and/or the capacitor impact on the temperature outside the dimming control 110. As presented in table 1602 and according to an aspect, an aluminum electrolytic capacitor is given a maximum temperature rating and a respective number of hours through which the capacitor is expected to last at that maximum temperature. In an embodiment, the maximum temperature rating is 105° C. For every 10° C. drop below the maximum temperature rating, the aluminum electrolytic capacitor's lifetime doubles. As described hereinabove, the life expectancy/half-life of a luminaire 112 may be extended by monitoring the temperature of its dimming control 110. A capacitor potential lifetime is calculated by Eq. 1 from above. This is illustrated by graphical representation 1604 of the table 1602.

Figure 17:
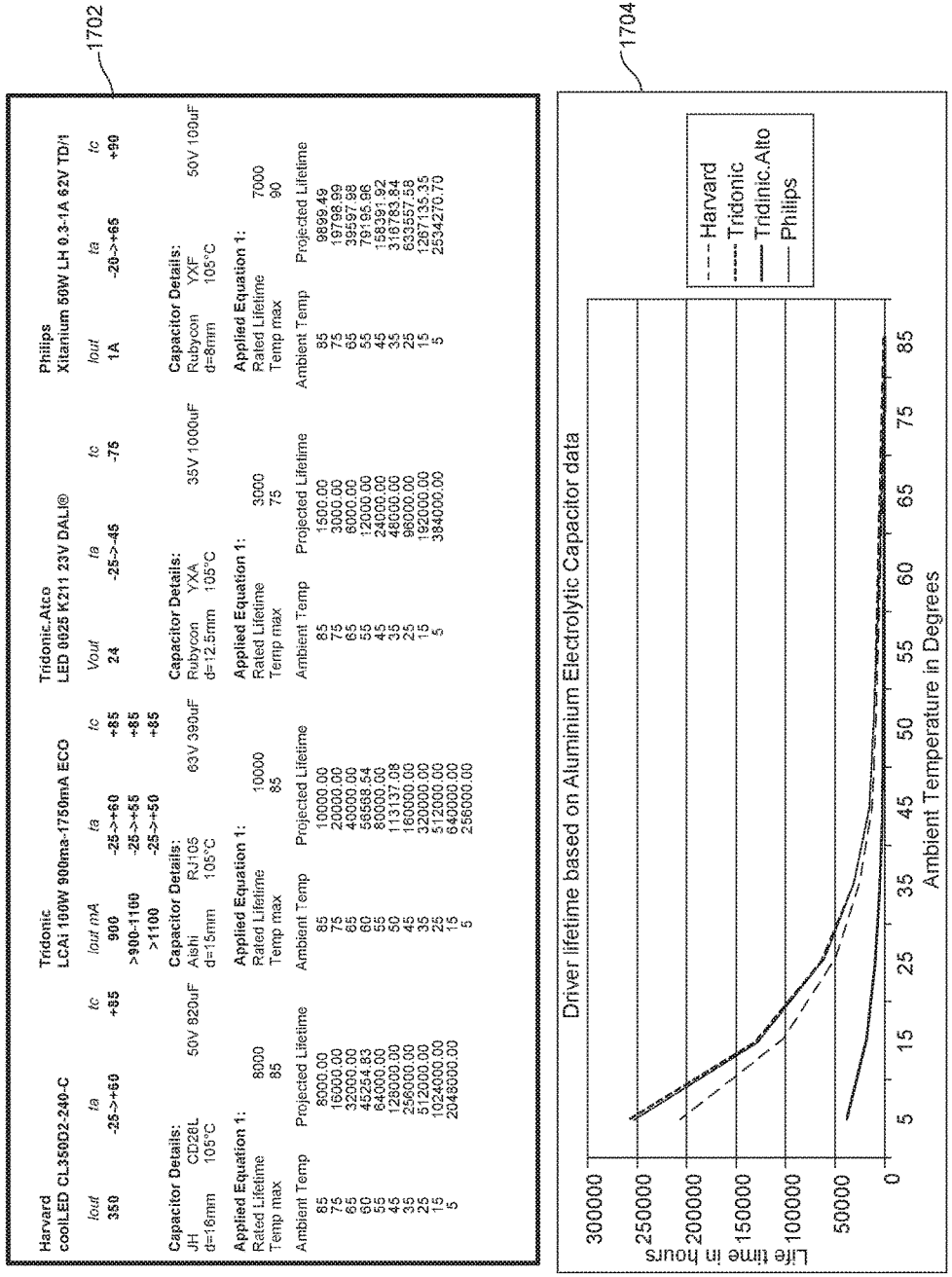
FIG. 17 illustrates a diagram of a dataset of drivers from leading manufacturers including their projected lifetime/life expectancy calculations.

FIG. 17 illustrates a dataset of luminaire drivers 110 from leading manufacturers, including their respective projected lifetime calculations. The date presented in table 1702 reflects that higher temperatures shorten the half-life of a luminaire dimming control 110, that is, the end-of-life of drivers are expedited when the drivers are exposed to higher temperatures. The data in table 1702 is data collected from existing leading manufacturers of electronic drivers. Chart 1704 includes a graphical representation of the data in table 1702. The data in table 1702 and chart 1704 include known data, which are normally provided by driver manufacturers in a driver data sheet. This known data may be utilized by the system 100 to predict the end-of-life of a driver such as dimming control 110.

Figure 18:
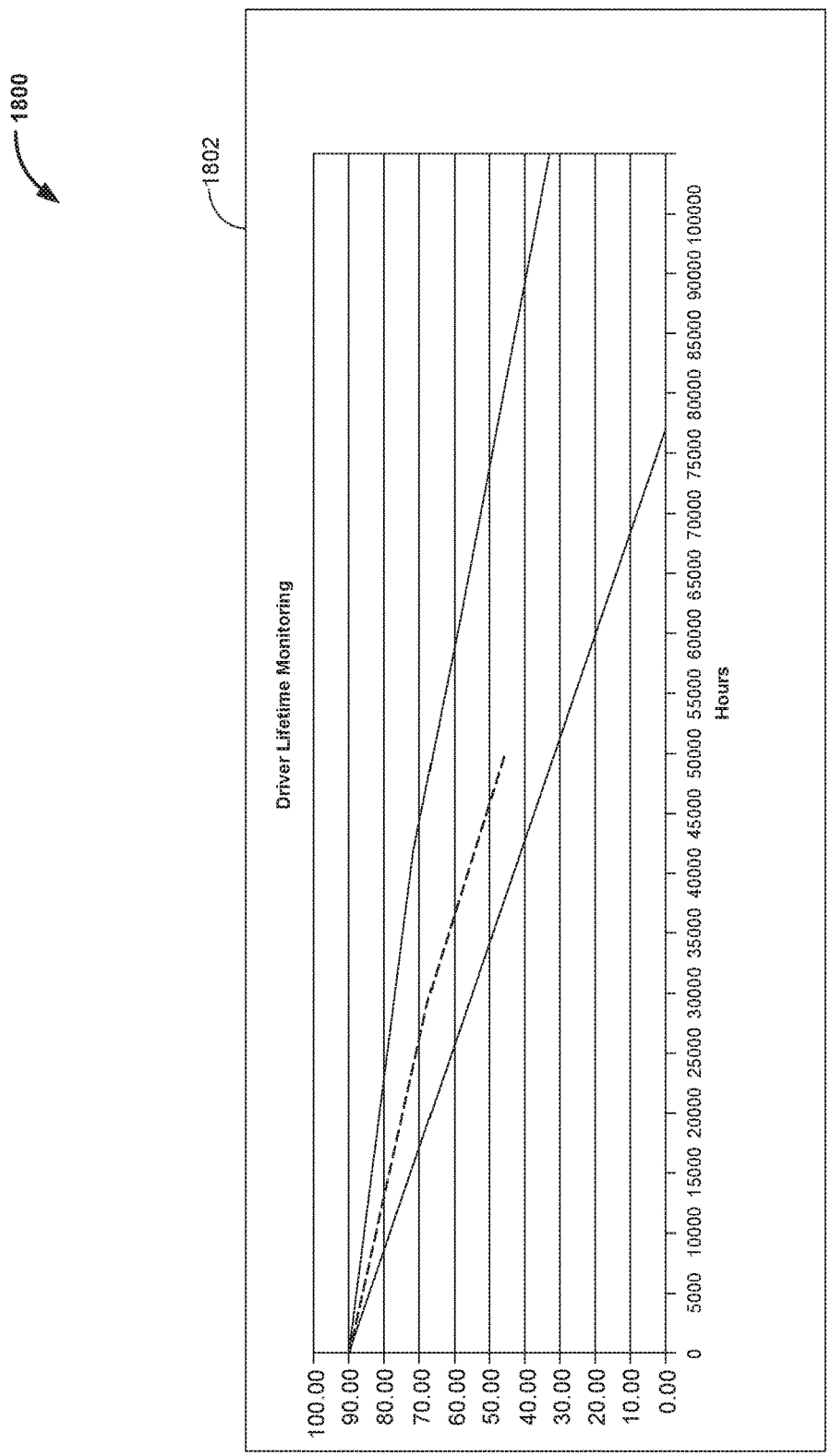
FIG. 18 illustrates a diagram of a system's prediction of a luminaire driver's lifetime/life expectancy, according to an aspect.
Figure 19:
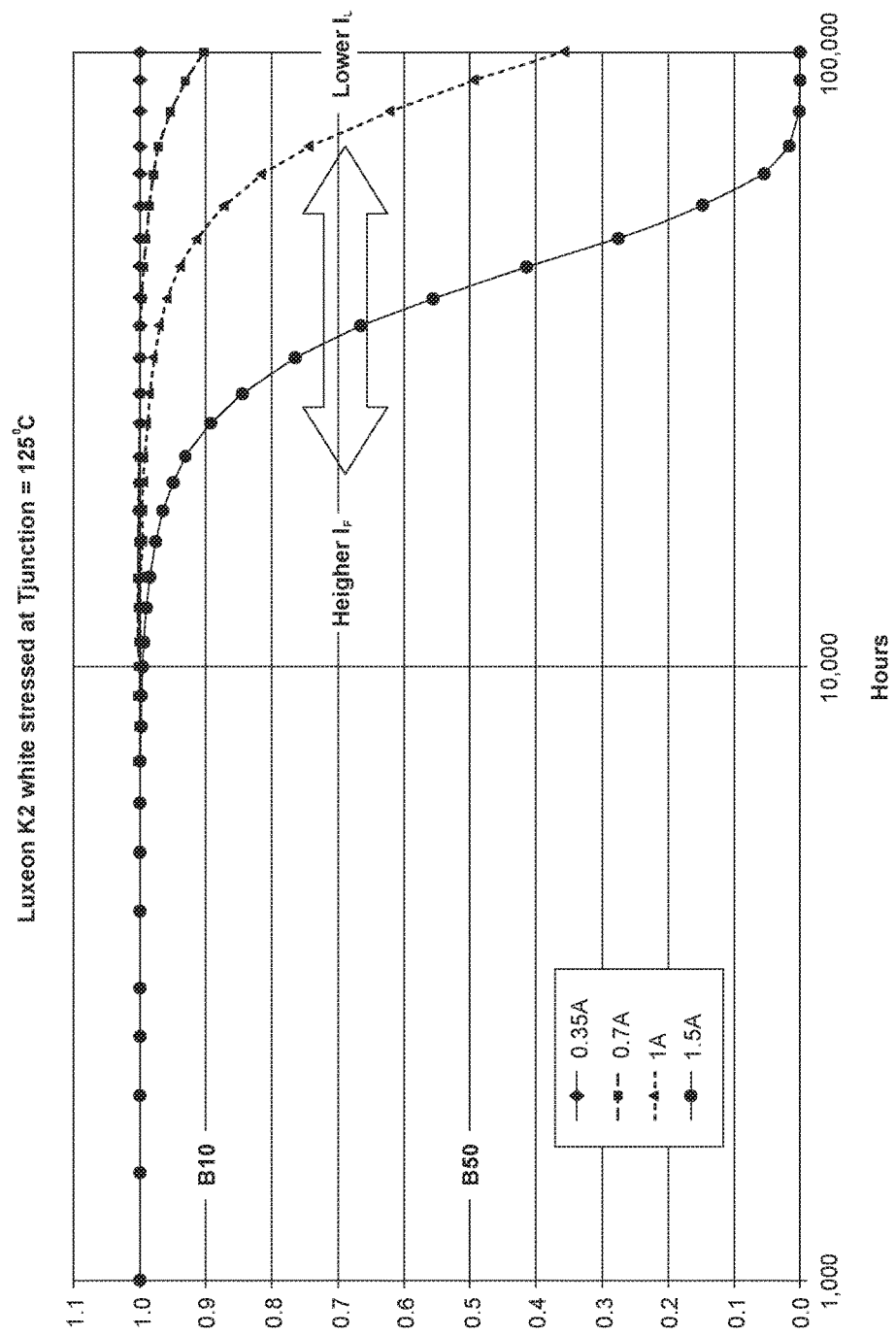
FIG. 19 illustrates a diagram of an LED device lifetime versus temperature and current to the device.
Figure 20:
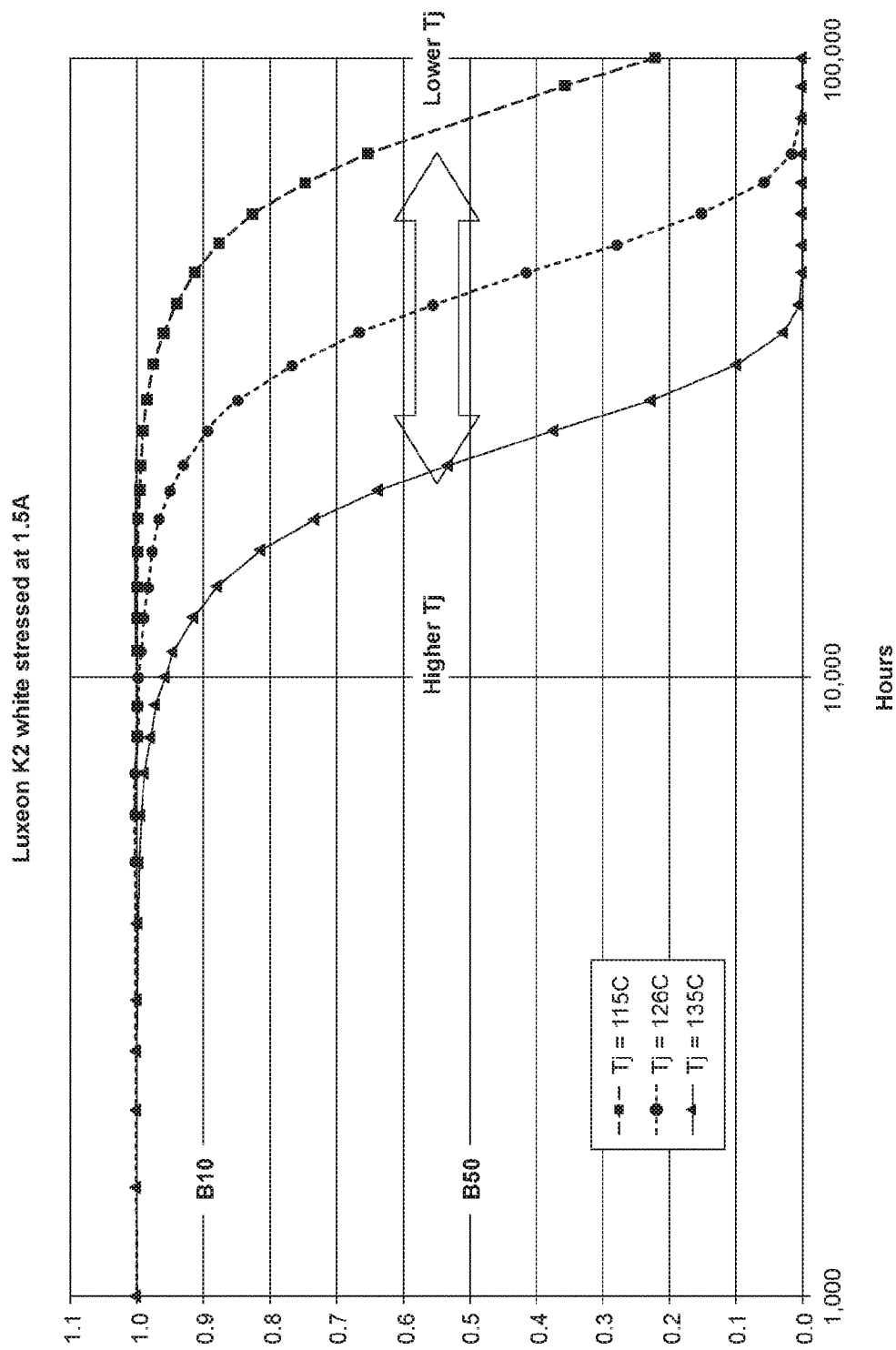
FIG. 20 illustrates another diagram of an LED device lifetime versus temperature and current.
Figure 21:
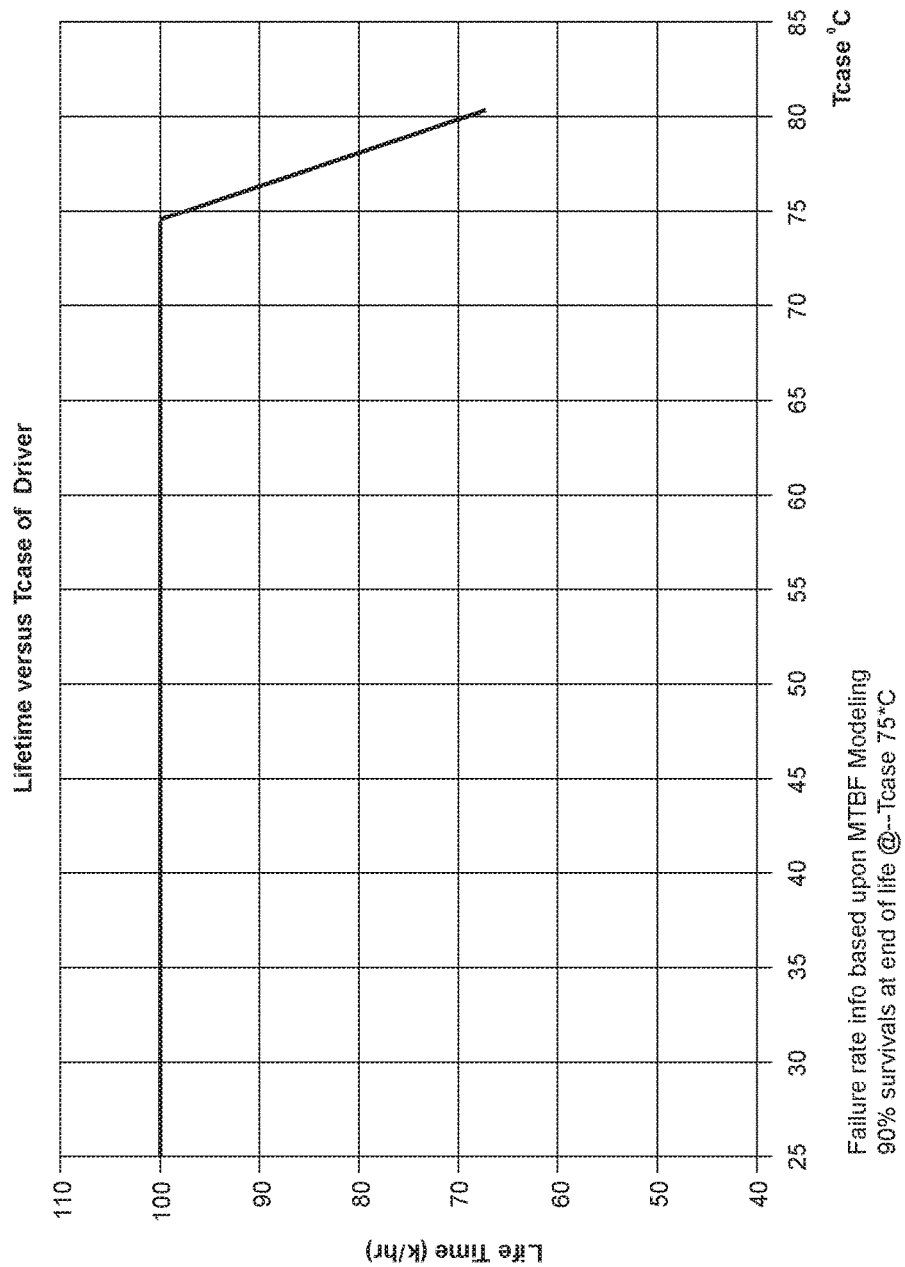
FIG. 21 illustrates a diagram of a luminaire driver lifetime versus case temperature of the driver.
Figure 22:
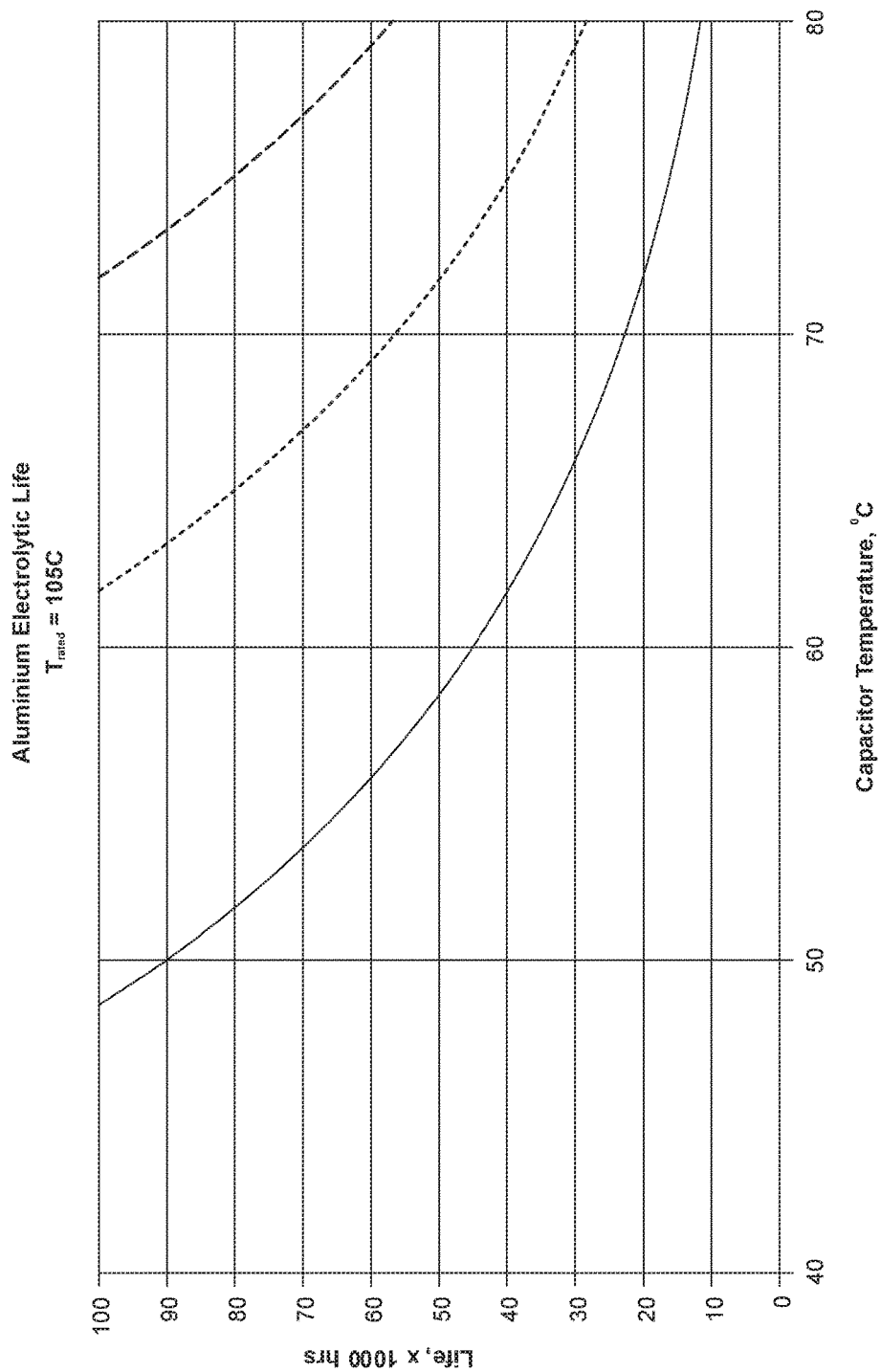
FIG. 22 illustrates a diagram of an aluminum electrolytic capacitor lifetime in a driver versus the capacitor temperature; and, FIG. 23 illustrates a diagram of the dimming level and associated power consumption of a luminaire over time.
Figure 23:
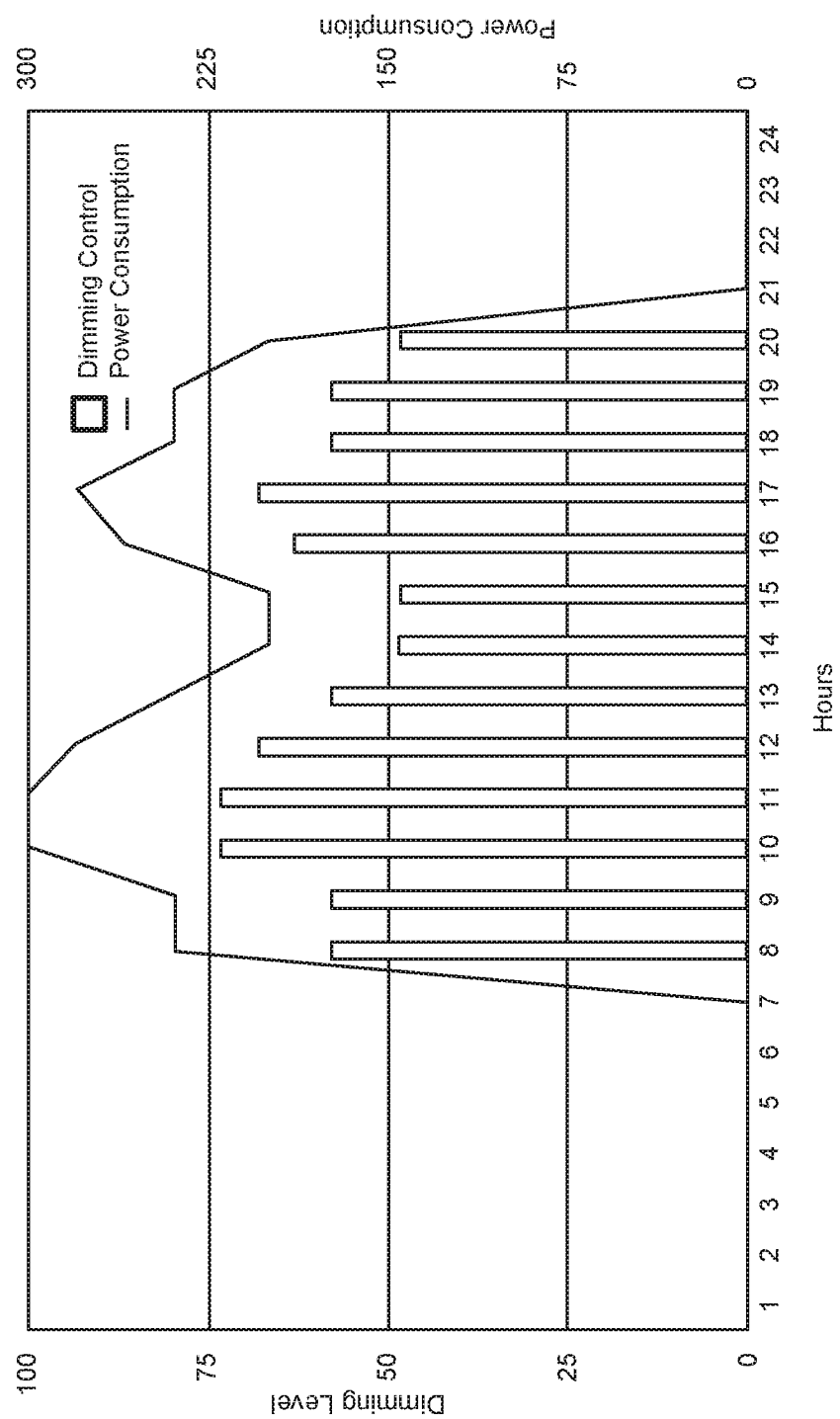

FIG. 18 is a chart 1802 illustrating a prediction of a luminaire driver's lifetime/end-of-life. The chart graphically presents an actual calculated health of a driver such as dimming control 110 over time. According to an aspect, the key contributing factor to the temperature is the ambient temperature changes, which can affect the aluminum electrolytic capacitors when the luminaire 112/LED is turned on or when the luminaire 112/LED is turned off. As result, the system 100 described herein may continuously monitor the ambient temperature, and show up-to-date end-of-life prediction of the luminaire 112 and the dimming control 110. As illustrated in FIG. 18, three data sets are presented. The first data set includes a 55° C. temperature, the second data set includes a 65° C. temperature, and the third data set includes a varying temperature. For both the first and second data sets, 55° C. and 65° C., the ambient temperature may be assumed to be constant and set to the level at which the dimming control 110 is powered ON. The level may have been previously measured. When the luminaire dimming control 110 is off, the ambient temperature drops to 17° C. The 'Varying' data set reflects the effects of varying ambient temperature when the luminaire driver is in operation.

The disclosure, in various embodiments, configurations and aspects, includes components, methods, processes, systems and/or apparatus substantially developed as depicted and described herein, including various embodiments, sub-combinations, and subsets thereof. The disclosure, in various embodiments, configurations and aspects, includes providing devices and processes in the absence of items not depicted and/or described herein or in various embodiments, configurations, or aspects hereof, including in the absence of such items as may have been used in previous devices or processes, e.g., for improving performance, achieving ease and/or reducing cost of implementation.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

In this specification and the claims that follow, reference will be made to a number of terms that have the following meanings. The terms "a" (or "an") and "the" refer to one or more of that entity, thereby including plural referents unless the context clearly dictates otherwise. As such, the terms "a" (or "an"), "one or more" and "at least one" can be used interchangeably herein. Furthermore, references to "one embodiment", "some embodiments", "an embodiment" and the like are not intended to be interpreted as excluding the existence of additional embodiments that also incorporate the recited features. Approximating language, as used herein throughout the specification and claims, may be applied to modify any quantitative representation that could permissibly vary without resulting in a change in the basic function to which it is related. Accordingly, a value modified by a term such as "about" is not to be limited to the precise value specified. In some instances, the approximating language may correspond to the precision of an instrument for measuring the value. Terms such as "first," "second," "upper," "lower", etc. are used to identify one element from another, and unless otherwise specified are not meant to refer to a particular order or number of elements.

As used in the claims, the word "comprises" and its grammatical variants, such as "including", and "having" logically also subtend and include phrases of varying and differing extent such as for example, but not limited thereto, "consisting essentially of" and "consisting of." Where necessary, ranges have been supplied, and those ranges are inclusive of all sub-ranges therebetween. These ranges as disclosed and/or used in the appended claims should cover those variations.

The terms "determine", "calculate" and "compute," and variations thereof, as used herein, are used interchangeably and include any type of methodology, process, mathematical operation or technique.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the disclosure requires more features than are expressly recited in each claim. Rather, as the following claims reflect, aspects of the exemplary embodiments lie in less than all features of a single foregoing disclosed embodiment, configuration, or aspect.

Moreover, the description of the disclosure has included descriptions of one or more embodiments, configurations, or aspects, and certain variations and modifications, other variations, combinations, and modifications that are within the scope of the disclosure.

What is claimed is:

1. A system for predicting a lifespan of a luminaire driver, the system comprising:
    a gateway configured to control at least one of a dimming level and a dimming control protocol of a dimming luminaire via a dimming control;
    a sensor subsystem in data communication with the gateway and configured to collect data regarding at least one of luminaire color content and color intensity and at least one aspect of an environment in which the dimming luminaire is installed; and,
    a server in data communication with the gateway,
    wherein the sensor subsystem is further configured to transmit collected data to the gateway,
    the gateway is further configured to transmit collected data to the server and to measure and transmit to the server a current dimming level of the dimming luminaire at a time when the collected data is collected, and
    the server is configured to calculate at least one of a half-life and an end of life for the driver based at least in part on the collected data and on the current dimming level of the dimming luminaire.

2. The system of claim 1, wherein the half-life and the end of life calculations are based at least in part on a comparison of the collected data and associated dimming levels of the dimming luminaire over time.

3. The system of claim 1, wherein the gateway is further configured to adjust at least one of the dimming level and the dimming control protocol of the dimming luminaire to extend at least one of the half-life and the end of life of the driver.

4. The system of claim 1, wherein the sensor subsystem includes at least one color sensor configured to face the dimming luminaire directly and measure at least one of the color content and color intensity of the dimming luminaire and at least one environment sensor configured to face away or in a downward direction from the dimming luminaire and measure at least one of temperature, humidity, ambient light, and movement of light and objects in the environment.

5. The system of claim 4, wherein the color sensor is at least one of a Red Green Blue (RGB) sensor and a Yellow Red Green Blue (YRGB) sensor.

6. The system of claim 4, wherein the environment sensor measures the temperature of the environment.

7. The system of claim 6, wherein the gateway is further configured to measure and transmit to the server a current dimming level of the dimming luminaire at a time when the temperature of the environment is measured and a result of the half-life and the end of life calculations is respectively a predictive, normalized half-life and end of life curve for the driver as a function of at least one of the temperature of the environment and the dimming level of the dimming luminaire.

8. A method for predicting a lifespan of at least one luminaire driver, the method comprising:
   measuring with a sensor subsystem at least one of color content and color intensity of a dimming luminaire and at least one aspect of an environment in which the dimming luminaire is installed;
   transmitting the sensor measurements to a server via a gateway in data communication with the sensor subsystem and server;
   determining at the server at least one of a half-life and an end of life for a driver associated with the dimming luminaire, based at least in part on the sensor measurements;
   measuring, with the gateway, a current dimming level of the dimming luminaire at a time when the sensor measurements are made;
   transmitting the current dimming level from the gateway to the server; and
   calculating the half-life and the end of life of the driver is based at least in part on the current dimming level of the dimming luminaire.

9. The method of claim 8, further comprising comparing the sensor measurements and associated dimming levels of the dimming luminaire over time as part of calculating the half-life and the end of life for the driver.

10. The method of claim 8, further comprising adjusting with the gateway at least one of a dimming level and a dimming control protocol of the dimming luminaire to extend at least one of the half-life and the end of life of the driver.

11. The method of claim 8, further comprising measuring with a color sensor configured to face the dimming luminaire directly at least one of color content and color intensity of the dimming luminaire and measuring with an environment sensor configured to face away or in a downward direction from the dimming luminaire at least one of temperature, humidity, ambient light, and movement of light and objects in the environment.

12. The method of claim 11, wherein the color sensor is at least one of a Red Green Blue (RGB) sensor and a Yellow Red Green Blue (YRGB) sensor.

13. The method of claim 11, wherein the environment sensor measures the temperature of the environment.

14. The method of claim 13, further comprising measuring with the gateway a current dimming level of the dimming luminaire at a time when the temperature of the environment is measured, transmitting the current dimming level from the gateway to the server, and generating as part of the half-life and the end of life calculations a respective predictive, normalized half-life and end of life curve for the driver as a function of at least one of the temperature of the environment and the dimming level of the dimming luminaire.

15. A system for predicting a lifespan of a luminaire driver, comprising:
   a gateway configured to control at least one of a dimming level and a dimming control protocol of a luminaire via a driver and to measure and transmit to the server a current dimming level of the luminaire at a time when the collected data is collected;
   a sensor subsystem in data communication with the gateway and configured to collect data regarding at least one of the luminaire color content and color intensity and at least one aspect of an environment in which the luminaire is installed;
   a server in data communication with the gateway; and,
   a luminaire and driver database in data communication with the server, wherein the luminaire and driver database is configured to receive and store the collected data,
   wherein luminaire and driver database comprises the at least one of the color content and color intensity, the temperature of the environment, and the associated dimming levels of the luminaire over time,
   wherein the server is configured to calculate at least one of a half-life and an end of life for the driver based at least in part on the collected data in the luminaire and driver database,
   wherein the sensor subsystem includes a color sensor configured to face the luminaire directly and measure at least one of the color content and color intensity of the luminaire and an environment sensor configured to face away or in a downward direction from the luminaire and measure at least a temperature of the environment, and
   wherein the half-life and the end of life calculations are based at least in part on a depreciation of the color content and color intensity of the luminaire and the associated temperature of the environment and the associated dimming levels of the luminaire over time, and a result of the half-life and the end of life calculations is respectively a predictive, normalized half-life and end of life curve for the driver as a function of at least one of the temperature of the environment and the dimming level of the luminaire.

* * * * *